(12) United States Patent
Trentacosta et al.

(10) Patent No.: US 7,993,606 B2
(45) Date of Patent: *Aug. 9, 2011

(54) ADAPTIVE MEMBRANE STRUCTURE

(75) Inventors: Joseph D. Trentacosta, Wilmington, DE (US); Vivek Kapur, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/548,677

(22) Filed: Aug. 27, 2009

(65) Prior Publication Data

US 2009/0314696 A1    Dec. 24, 2009

Related U.S. Application Data

(63) Continuation-in-part of application No. 11/118,961, filed on Apr. 29, 2005, now Pat. No. 7,597,855.

(60) Provisional application No. 60/567,357, filed on Apr. 30, 2004.

(51) Int. Cl.
*A41D 13/00* (2006.01)

(52) U.S. Cl. ......... 422/501; 422/50; 422/68.1; 428/137; 251/333; 251/129.01; 2/457

(58) Field of Classification Search .............. 422/50, 422/68.1, 501; 2/457; 251/129.01, 333; 428/137

See application file for complete search history.

(56) References Cited

U.S. PATENT DOCUMENTS

| | | | |
|---|---|---|---|
| 1,243,122 A | 10/1917 | Winters | |
| 4,194,041 A | 3/1980 | Gore et al. | |
| 4,455,187 A | 6/1984 | Von Blucher et al. | |
| 4,515,761 A | 5/1985 | Plotzker | |
| 4,538,642 A | 9/1985 | Schutten et al. | |
| 4,772,510 A | 9/1988 | McClure | |
| 4,833,010 A | 5/1989 | Langley | |
| 4,855,178 A | 8/1989 | Langley | |
| 4,914,752 A * | 4/1990 | Hinson et al. | 2/458 |
| 5,161,774 A * | 11/1992 | Engelsdorf et al. | 251/11 |
| 5,260,360 A | 11/1993 | Mrozinski et al. | |
| 5,273,814 A | 12/1993 | Kelly | |
| 5,626,947 A | 5/1997 | Hauer et al. | |
| 6,418,968 B1 * | 7/2002 | Pezzuto et al. | 137/833 |
| 6,579,948 B1 | 6/2003 | Tan et al. | |
| 2002/0027101 A1 * | 3/2002 | Insley et al. | 210/488 |

OTHER PUBLICATIONS

Baker et al., Membrane Technology, Encyclopedia of Polymer Science and Technology, 3rd Edition, pp. 184-248, 2003, considered from the parent U.S. Appl. No. 11/118,961.

* cited by examiner

Primary Examiner — Lyle Alexander

(57) ABSTRACT

An adaptive membrane structure is provided. The adaptive membrane structure has movable membranes that can be made to change its gas, liquid or particulate permeability in response to surrounding environmental conditions. Such adaptive membrane structures can be used to provide protective apparel that is comfortable to wear wherein the level of protection provided is based on conditions in the environment. The adaptive membrane structures can be used to provide protective enclosures.

15 Claims, 21 Drawing Sheets

Front　　　　　　Back

Exploded View

Assembled View

ADAPTIVE MEMBRANE STRUCTURE

This application is a continuation-in-part of U.S. application Ser. No. 11/118,961, filed Apr. 29, 2005, which in turn claims the benefit of U.S. Provisional Application No. 60/567,357, filed Apr. 30, 2004.

FIELD OF THE DISCLOSURE

The present invention relates to protective articles comprising an adaptive membrane structure that can be made to change its liquid or vapor permeability in response to surrounding environmental conditions. The protective articles include protective enclosures and protective apparel wherein the level of protection provided is based on conditions in the environment.

TECHNICAL BACKGROUND

There is a growing need for personal protective apparel that guards against toxic chemical and biological agents. These agents may be
 (a) accidentally released in a chemical manufacturing plant, in a scientific or medical laboratory or in a hospital;
 (b) released intentionally during wartime by a government to attack the military forces of the opposition; or
 (c) released during peacetime by criminal or terrorist organizations with the purpose of creating mayhem, fear and widespread destruction.

For this reason, the United States military and other defense organizations of countries all over the world have sought to provide adequate protection against chemical and biological warfare agents. The need for such protective apparel also extends to police departments, fire departments, emergency responders and health care providers.

According to the *Handbook of Chemical and Biological Warfare Agents* (D. Hank Ellison, CRC Press, Boca Raton, Fla., 1st edition, 1999), most chemical warfare toxins are fatal at concentrations as low as 1 part per million (ppm). Hence, to provide adequate protection from chemical warfare agents, a protective suit has to be almost impermeable to such chemicals. It is not difficult to devise structures that are impermeable to toxic chemical vapors and liquids, but such structures are also hot, heavy and uncomfortable to wear. The degree of comfort offered by a protective suit is largely determined by the amount of water vapor that can permeate through the protective fabric. The human body continuously perspires water vapor as a method for controlling body temperature. When a protective fabric hinders the loss of water vapor from the body, the transpirational cooling process is hindered, which leads to personal discomfort. When a protective suit allows little or no loss of water vapor, extreme heat stress or heat stroke can result in a short period of time. Hence, in addition to offering the highest levels of protection against toxic chemicals and liquids, a practical chemical and biological protective suit must have high water vapor transmission rates. The appropriate protective structure must also be light in weight and offer the same high level of protection over a long period of time.

There is a large variety of protective apparel available in the market today. The garments that offer the highest levels of comfort (high water vapor transmission rates) offer little or no protection against chemical and biological hazards, while those that offer the highest levels of protection against toxic hazards are also typically impermeable to water vapor.

Also, disclosed all existing protective garments offer the same constant level of protection at all times. In most situations, the wearer of a protective garment does not require protection from the environment at all times. Protection is only needed when a toxic chemical or biological agent is present in the environment.

Consequently, there remains a need for protective articles having a variable and controllable permeability.

SUMMARY

One aspect of the present invention is an article comprising at least one adaptive membrane structure, said adaptive membrane structure comprising first and second membranes, and means to respond to an actuating stimulus that moves the first membrane into contact with the second membrane thereby decreasing the permeability of the structure to gas, vapor, liquid and/or particulates is decreased, whereby such response provides environmental protection to a human, animal, or object enclosed by the article, wherein
 (a) each membrane has an array of holes, and the holes of the first membrane are substantially out of registration, or are out of registration, with the holes of the second membrane;
 (b) the porosity of the article is at least 0.5%;
 (c) the actuating stimulus is an electrostatic force, magnetic force, hydrostatic force, or hydrodynamic force; and
 (d) the article has an exposed area of at least about one square foot and the at least one adaptive membrane structure provides at least 10% coverage of the exposed area.

Other objects and advantageous technical effects offered by the invention disclosed herein are more fully disclosed below.

DETAILED DESCRIPTION

Figure 1A:
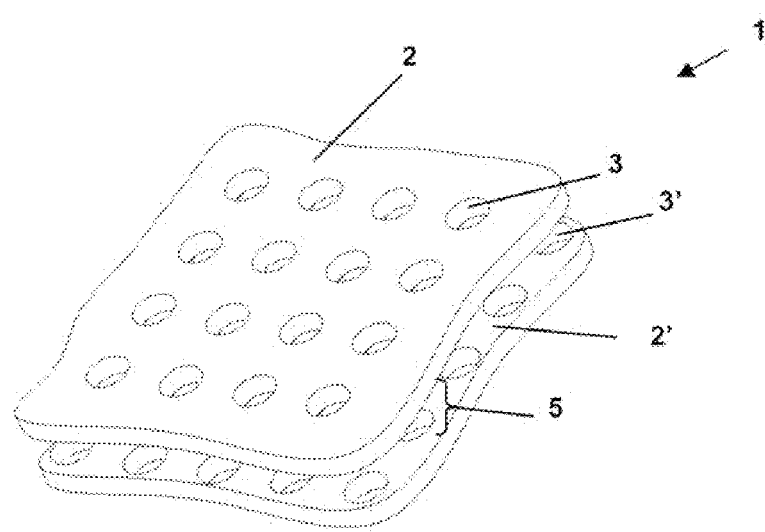
FIG. 1 is a schematic diagram of an unactuated adaptive membrane structure, indicating high permeability. (1A: perspective view. 1B: plan view. 1C: sectional view.)

The present invention provides an article comprising at least one adaptive membrane structure. An "adaptive membrane structure" is a structure comprising at least two membranes wherein the membranes are movable upon the activation or application of an actuating stimulus such as a force. The membrane structure is thus "adaptive" in the sense that the permeability of the structure can be changed based on the conditions in the external environment.

The adaptive membrane structures disclosed herein enhance the protective performance of an article, having exposed area, which encloses a human being, an animal or an object that needs to be protected from the surrounding environment. The term "exposed area" as used herein refers to the area of the article that is in contact with the surrounding environment. The article can be a protective garment or protective enclosure for protecting, for example, an individual or a collection of human beings; an individual or a collection of animals; or an object, such as the whole or part of a building envelope, machinery, electronic equipment, industrial or military equipment, or agricultural goods. The enclosure or garment can provide protection against various liquid, gas, vapor and particulate species, such as, for example, liquid chemical droplets, toxic vapors and gases, water vapor, aerosols, and biological spores.

A "membrane" as the term is used herein is a discrete, thin structure that moderates the transport of species in contact with it, such as gas, vapor, aerosol, liquid and/or particulates. Examples of membranes include film, plastic sheeting, synthetic barriers, layers, laminar structures, woven fabric, and nonwoven sheet. A membrane can be chemically or physically homogeneous or heterogeneous. A "microporous membrane" is a membrane typically containing pores in the range of 0.1 to 10 micrometers in diameter. Microporous membranes are typically characterized by the fraction of total membrane volume that is porous (i.e. relating to porosity), a term reflecting the average pore length within the membrane compared with membrane thickness (i.e. relating to tortuosity), and average pore diameter. The term "pore" as used herein denotes an opening that exists in a membrane that may or may not completely traverse the membrane. Typically, the pore size, the pore shape and/or the pore placement is not well defined or controlled, though there may be a relatively reproducible average pore size and/or pore size distribution.

The membranes used in the adaptive membrane structure typically have holes as distinguished from pores, a "hole" being an opening that completely traverses a membrane. The holes of one membrane may or may not be the same size and shape as the holes of another membrane. Although holes may be described herein in terms of their having the shape of a circle, it is not required that a hole have a shape that is perfectly or even approximately circular.

The term "porosity" as used herein means the volume occupied by all of the holes or pores in a material divided by the total apparent volume of the material (i.e., volume of the solid material plus volume of pores or holes). When the exposed surface includes the holes or pores and the holes or pores have a uniform cross-sectional area (e.g., are right cylinders), then the porosity simply equals the total cross sectional area of the holes or pores divided by the total exposed surface area (i.e., solid material area plus hole or pore area) of the material.

The holes of one membrane can be aligned with the holes of another membrane, in the vertical sense of a line perpendicular or substantially perpendicular to the respective planes of the membranes, such that the holes overlap completely, partially or not at all. Holes overlap completely when, if they are the same size, their boundaries are coincident in vertical alignment, or if they are not the same size, the area of the smaller hole fits entirely within the area of the larger hole. Holes do not overlap at all when, again in the sense of vertical alignment, a line perpendicular or substantially perpendicular to the respective planes of the membranes that passes through a hole on one membrane does not pass through any part of a hole on the other membrane. Membranes that have no overlap are shown in FIGS. 1C and 2C. Partial overlap is the intermediate condition when the perpendicular or essentially perpendicular line passing through a hole on one membrane will pass through only a portion of a hole on the other membrane.

The term "open area" is used to refer to the extent, expressed as a percentage, to which the respective holes of two membranes overlap. For membranes that do not overlap at all, such as those of FIGS. 1C and 2C, the open area is defined as 0%. Conversely, an open area of 100% corresponds to the existence of the maximum open area, which is achievable by arranging a particular set of membranes such that the holes completely overlap. A percentage between 0 and 100 indicates partial overlap. The terms "not in registration" and, equivalently, "out of registration" are used herein to indicate that the holes in two membranes do not overlap at all (referring again, for example, to FIGS. 1C and 2C); this is equivalent to having an open area of 0. The term "substantially out of registration" indicates that there is partial overlap, i.e. that the open area of the membrane structure is in the range of from greater than 0% up to, but not including, 50%.

The adaptive membrane structure can be "actuated", which denotes the state of the structure upon the application or operation of a stimulus, such as a force (the "actuating stimulus"), which causes surfaces of adjacent membranes to move into contact with each other, thereby changing the permeability of the membrane structure. Adjacent membranes are membranes that can be brought into contact with each other. The term "unactuated" thus denotes the state of the adaptive membrane structure before application of the actuating stimulus, in which state a gap exists between the membranes that will be brought into contact upon application of the actuating stimulus. The term "deactuated" denotes the state of the adaptive membrane structure after the application and subsequent removal of the actuating stimulus when accompanied by reformation of the gap between adjacent membranes that had been in contact when actuated.

The term "adaptive barrier system" as used herein denotes a system comprising an adaptive membrane structure in which actuation changes the permeability of the membrane structure to chemical, biological and/or particulate species.

Thus, the adaptive membrane structure is capable of displaying a variety of states of gas, vapor, liquid and/or particulate permeability. For example, when the adaptive membrane structure is used for protection against hazardous agents, it can display two different states of permeability. In one state denoted herein the "unactuated" state, when hazardous environmental conditions do not exist, the membrane structure is permeable to water vapor and gases, thereby offering a higher level of personal comfort than is experienced with a water vapor impermeable garment. When the membrane structure is exposed to a hazardous environment, it is transformed to another state, in which it is substantially impermeable to hazardous chemical and/or biological toxins and/or pathogens, thereby providing protection when it is needed. In the actuated state, the structure may, however, remain permeable to water vapor.

The conversion of the adaptive membrane structure from one state of permeability to another state of permeability is brought about by the application of a stimulus, such as a force, herein termed an "actuating stimulus". The actuating stimulus can be any of several forms including pressure, force, change in temperature or ambient concentration of water vapor, voltage, current, magnetic field, and electric field. In one embodiment, the actuating stimulus takes the form of an applied electric field, which causes membranes within the structure to move to convert the structure from an unactuated to an actuated state.

The application of the actuating stimulus can be effected with a manually operated switch; that is, an individual receiving a notice or warning in some form (e.g., audible alarm, odor, oral communication, signal from a sensor attached to the protective garment or enclosure.) that protection from the environment appears necessary can manually perform whatever operation is needed to apply the actuating stimulus (e.g., press a button or move a switch). In an alternative embodiment, however, a sensor can detect a change in the environment in which the structure is located, and can automatically activate the actuating stimulus.

Figure 1B:
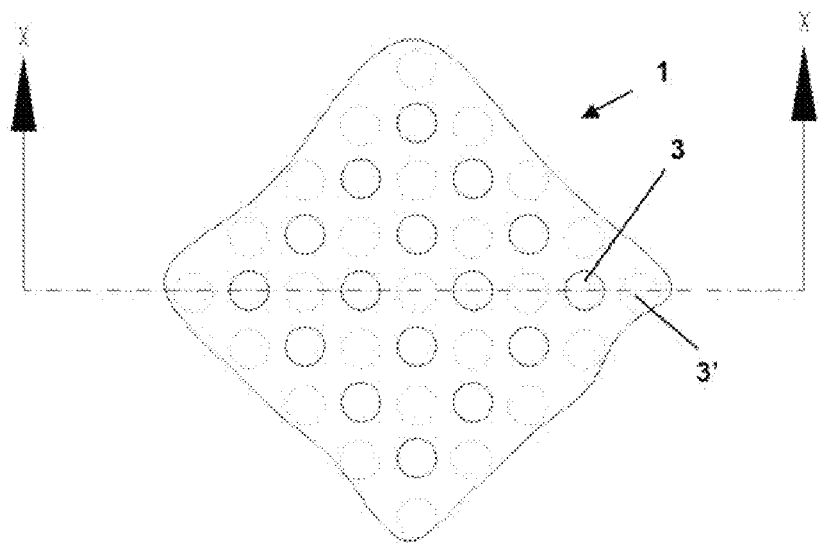
Figure 1C:
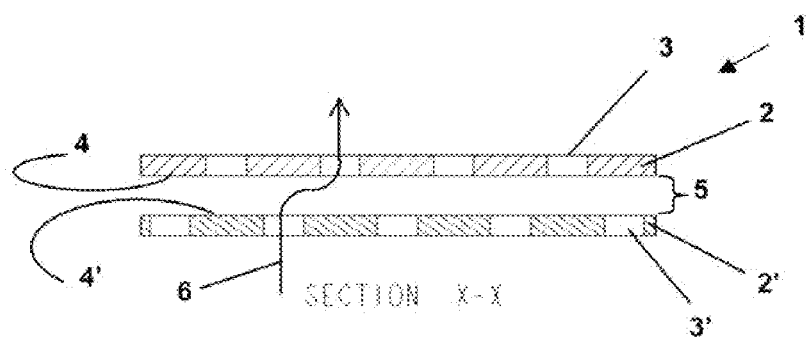
Figure 2A:
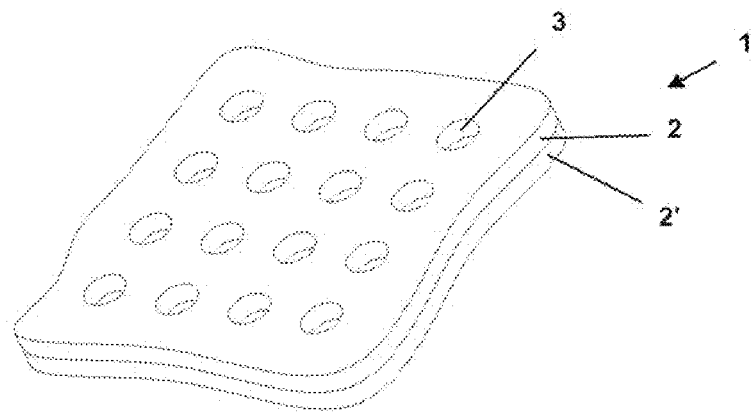
FIG. 2 is a schematic diagram of an adaptive membrane structure in its actuated state, illustrating the lack of registration of holes on adjacent membrane layers. (2A: perspective view. 2B: plan view. 2C: sectional view.)
Figure 2B:
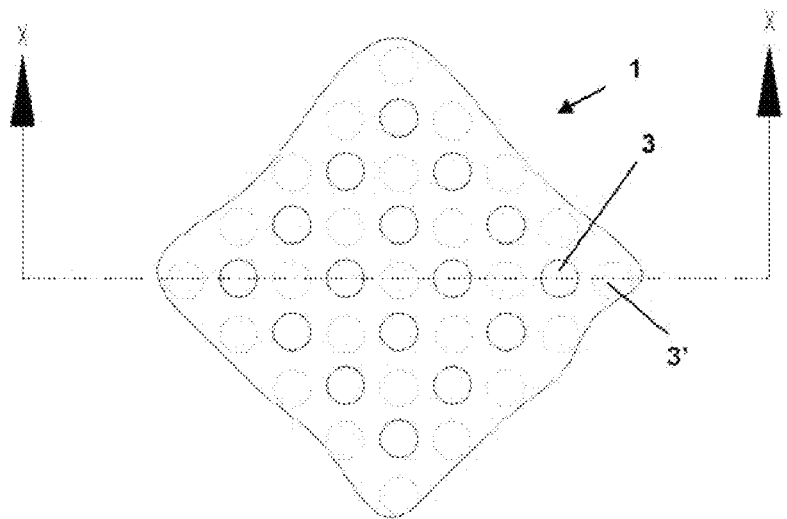
Figure 2C:
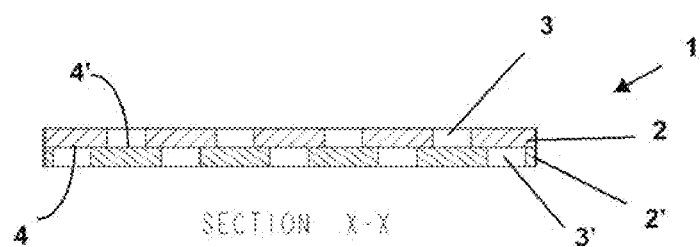

A schematic of one embodiment of an adaptive barrier system is shown in FIGS. 1A, 1B and 1C. The system comprises a pair of planar membranes 2 and 2' that are largely parallel to each other, each membrane further comprising a geometric array of holes such as those denoted 3 and 3' in FIGS. 1A, 1B and 1C. The holes completely traverse the thickness of the membranes, giving rise to a path of increased convection and/or diffusion of a chemical, biological and/or particulate species across and through the membrane thickness when compared to convection and/or diffusion of the same species through the membrane material surrounding the hole. When the adaptive barrier system is not actuated, the adjacent surfaces 4 and 4' of the membrane pair 2 and 2' are not in contact with each other, such that a gap 5 exists between membranes 2 and 2'. When an actuating force is applied to the adaptive barrier system, it moves one or both of the membranes 2 and 2' the surfaces 4 and 4' of which are brought in contact with each other, thus eliminating the gap between 2 and 2', as shown in FIGS. 2A, 2B and 2C.

The array of holes in each membrane is such that the openings of the array of holes on the adjacent membrane surfaces 4 and 4' are typically at least substantially out of registration with each other. That is, when the adaptive barrier structure is actuated, the degree of hole overlap is such that the open area is reduced to less than 50%. It is preferred that the open area be reduced to 10% or less, and more preferred that it be reduced to 1% or less upon actuation. In a further preferred embodiment, the holes are out of registration, and the open area is reduced to 0% upon actuation. In this embodiment, no hole opening on the surface 4 of the membrane 2 will overlap with a hole opening on the adjacent surface 4' of the membrane 2'. When the two adjacent membranes 2 and 2' are in contact, the holes of each membrane are therefore effectively sealed. There is consequently no continuous porous path for convection and/or diffusion of chemical, biological and/or other particulate species across two adjacent membranes in contact, as seen in FIG. 2C. However, when the two adjacent membrane surfaces 4 and 4' are not in contact, chemical, biological and/or other particulate species may traverse one membrane through its holes, enter the gap between the non-contacting membranes, and then traverse the second membrane through its holes (see, e.g., flow path 6 in FIG. 1C). Convection and/or diffusion of species will be greatly enhanced through adjacent membranes that are not in contact as compared to convection and/or diffusion of the same species when the same adjacent membranes have been moved into contact through action of the actuating force.

Figure 3:
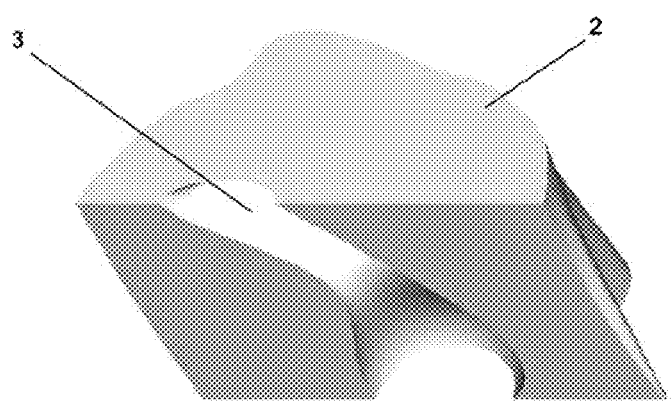
FIG. 3 is a schematic diagram of a section view of a membrane with a hole of non-circular cross-section.

As noted above, although the holes depicted in FIGS. 1A, 1B, 1C, 2A, 2B and 2C are right circular cylindrical holes with linear axes normal to the plane of the membranes, the holes are not limited to circular or cylindrical geometry. FIG. 3 shows a section view of part of a membrane according to embodiments of the invention, with a hole with non-circular cross-section, which changes in shape and size as it traverses the membrane along a general tortuous path. The optimum hole diameter will vary depending on the specific use to be made of the adaptive membrane structure, particularly how much flow or diffusion is desired through holes in the unactuated state. In all cases, the holes are large enough to allow transport to occur in the unactuated state.

Although the hole arrays depicted in FIGS. 1A, 1B, 1C, 2A, 2B and 2C comprise the same regular square pitch pattern, the hole arrays of the adaptive membrane structures disclosed herein are not limited to a regular square pitch pattern.

Again referring to FIGS. 1A, 1B, 1C, 2A, 2B and 2C, the membranes 2 and 2' can be fabricated from the same or different materials or combinations of materials and, furthermore, each membrane of the pair can have the same or different thickness. The materials from which the membranes are fabricated are selected to impart desirable levels of permeability to one or more species, which may come in contact with the membrane in use. For example, the material comprising the membrane can be selected to have high permeability to water vapor but very low permeability to one or more human toxic or poison agents or pathogens as may be encountered by military personnel subjected to a chemical warfare attack.

The materials that can be used to create membranes 2 and 2' can be chosen from any sheet structure, but it is preferred that the sheet structure be flexible, and it is also preferred, although not necessary, that the materials used are polymeric in nature. Preferably, the flexible sheet structure can be prepared from at least one polymer component. Such polymer sheets or films, used to create membranes 2 and 2', may be continuous (i.e. containing no microvoids or micropores) or microporous. Methods for creating polymer sheets or films are well known in the art. disclosed Continuous polymer films to be used to create membranes 2 and 2' can be semipermeable in nature. Semipermeable polymer membranes and their manufacture are known, for example, from sources such as U.S. Pat. No. 4,515,761 (Plotzker) and U.S. Pat. No. 6,579,948 (Tan).

The starting materials to create the membranes used in the adaptive membranes disclosed herein are not limited to continuous polymer films. Suitable starting materials can also have microvoids or micropores such as those present in microporous membranes, in which the typical pore size is about 0.1 to 10 micrometers.

The membrane can also contain materials to adsorb, absorb or react with harmful and undesired species. Hence, the membrane can include activated carbon, high surface silica, molecular sieves, xerogels, ion exchange materials, powdered metal oxides, powdered metal hydroxides, antimicrobial agents, and the like, which may be in the form of nanoparticles if so desired. Such materials are typically mixed into the membrane material during the membrane formation process, which can include a process such as extrusion compounding or solution casting.

Holes for the adaptive membrane structures disclosed herein can be formed by any hole manufacturing process known in the art, including mechanical punching, laser or electron beam drilling, and chemical etching. Once the holes have been created, the membranes can be further processed to reduce any surface distortion that may have resulted due to hole formation process.

A preferred actuating stimulus for use in the adaptive membrane structures is the force produced by electrostatics. The preferred electrostatic force can be applied to the structure by incorporating electrically conducting materials in or onto specific regions of at least two and possibly more membranes such that upon action of appropriate circuitry, the conducting regions on at least two membranes become oppositely charged, thereby creating an attractive force which brings two adjacent membranes into contact. In one embodiment, therefore, means to respond to an actuating stimulus may include such electrically conducting materials, and the features, lines and patterns into which they may be formed, on which an electrostatic force may operate.

Figure 4A:
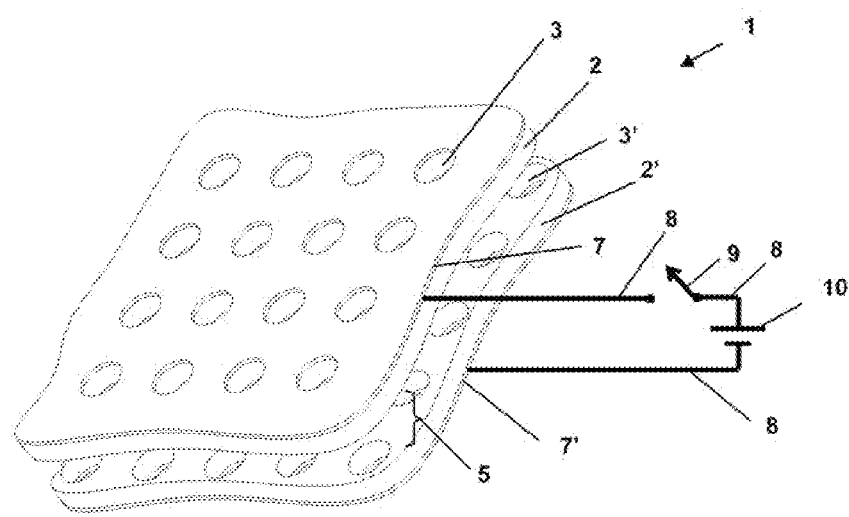
FIG. 4 is a schematic diagram of an unactuated adaptive membrane structure comprising a pair of adjacent membranes, each outer surface coated with a conducting layer. (4A: perspective view. 4B: plan view. 4C: sectional view.)
Figure 4B:
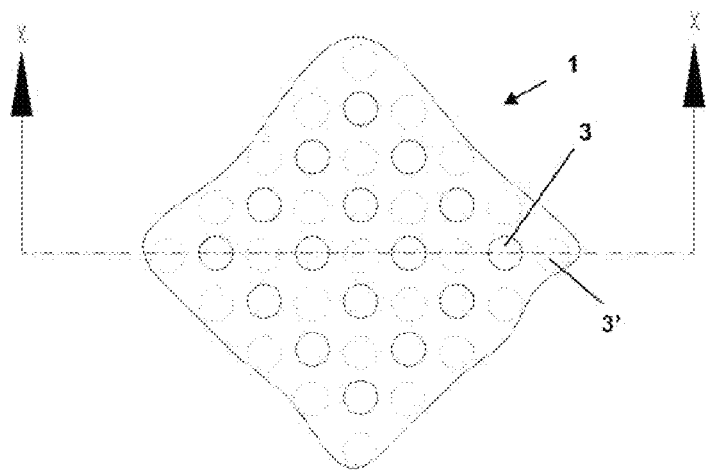
Figure 4C:
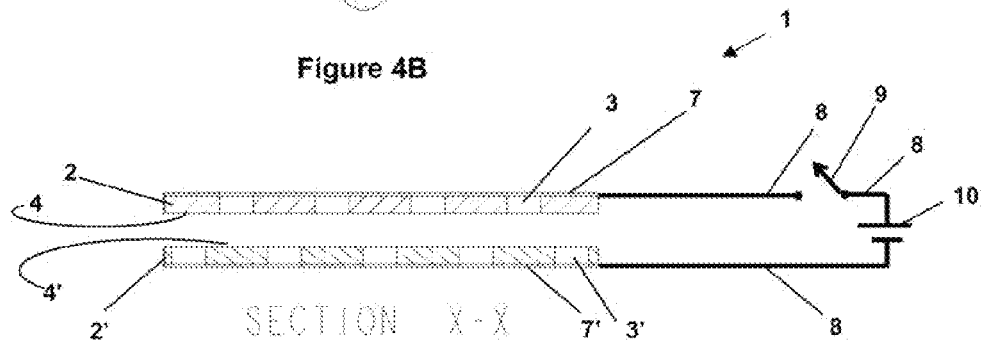

FIGS. 4A, 4B and 4C show schematically a particular embodiment of a pair of adjacent membranes 2 and 2' configured for an electrostatic actuating force. In this case, the surface of each membrane that is not adjacent to gap 5, which separates the membranes, is coated with a conducting layer 7 and 7'. Also, layers and/or other membranes can be interposed between the membranes with holes that come into contact and the place where direct application of the actuating stimulus occurs.

Figure 5A:
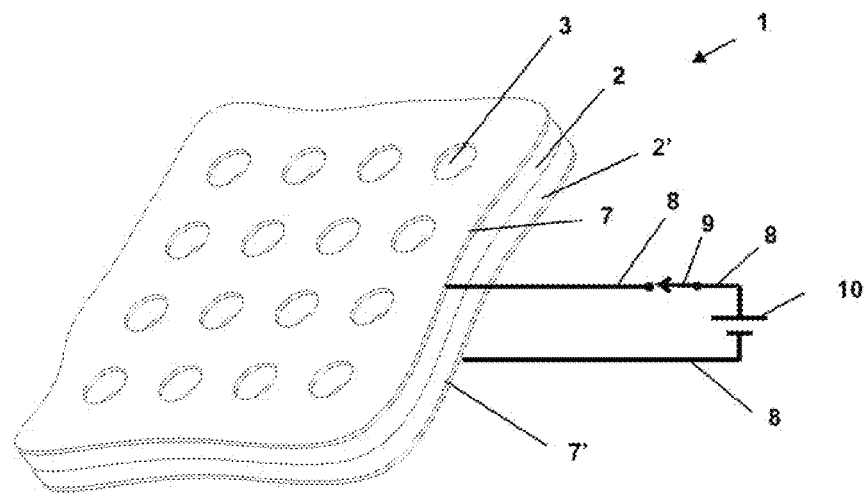
FIG. 5 is a schematic diagram of the adaptive membrane structure of FIG. 4 as actuated. (5A: perspective view. (5B: plan view. 5C: sectional view.)
Figure 5B:
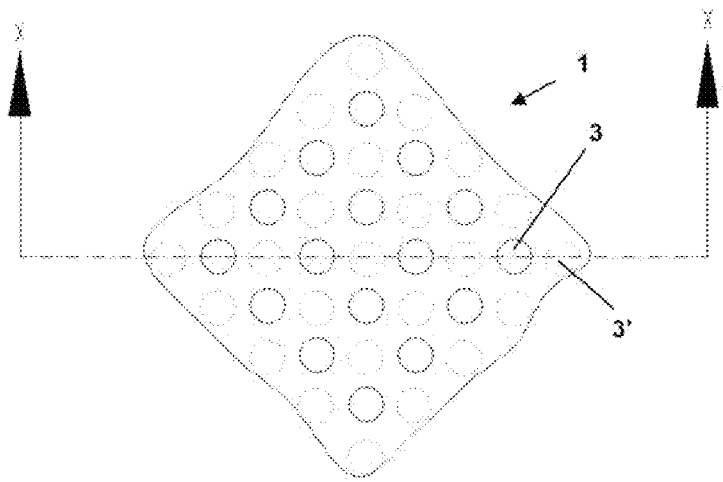
Figure 5C:
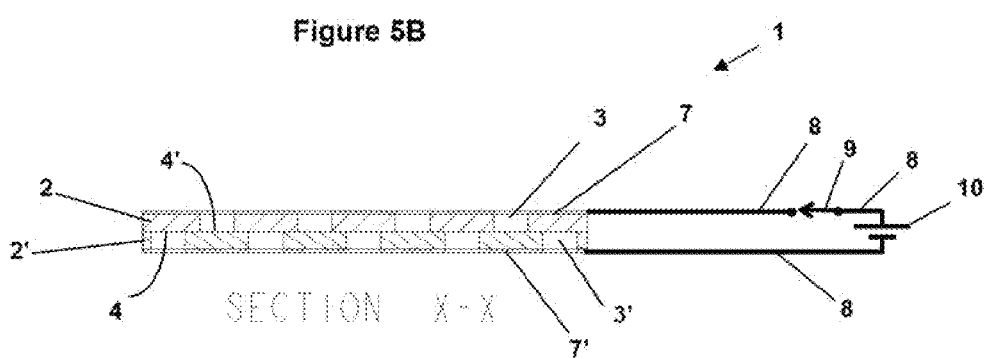

As depicted in FIGS. 4A and 4C, the two coated layers on the adjacent membranes are connected in series with each other through conductors 8 to a switch 9 and a source of electrical potential 10 which may include a battery or other power source such as a solar panel or fuel cell. As shown in FIGS. 4A and 4C, when the switch is open, there is no electromotive force and thus no actuating stimulus. As shown in FIGS. 5A and 5C, however, when the switch is closed, an attractive electrostatic force develops between the membranes and thereby brings the membranes into contact along their adjacent surfaces.

Figure 6A:
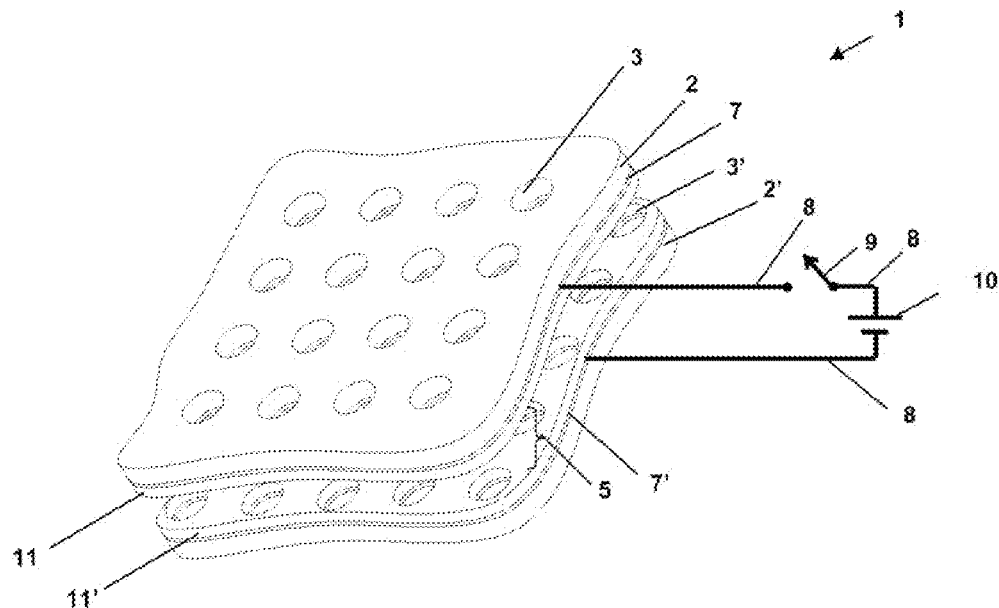
FIG. 6 is a schematic diagram of an adaptive membrane structure in which conductive layers are coated with dielectric material. (6A: perspective view. 6B: plan view. 6C: sectional view.)
Figure 6B:
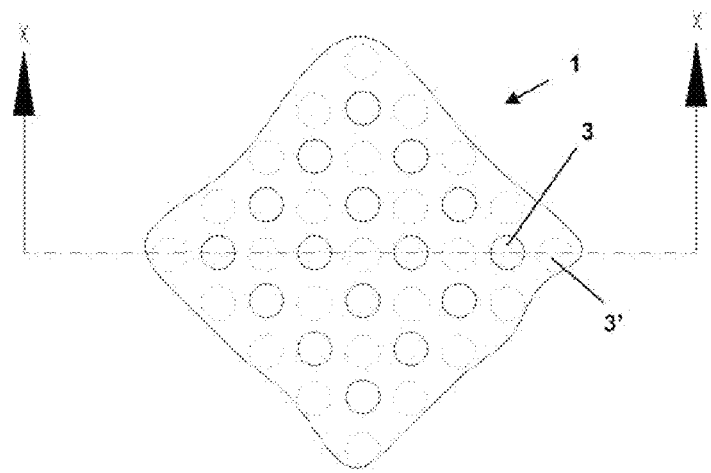
Figure 6C:
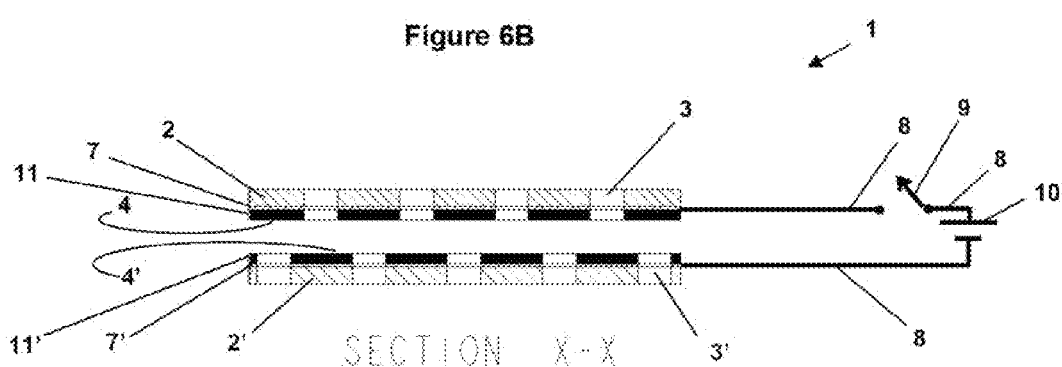

Additionally, as shown for example in FIGS. 6A, 6B and 6C, the conductive layers 7 and 7' on each membrane can be coated with one or more dielectric layers 11 and 11', which can impart additional features to the membrane structure. In particular, these layers can serve to insulate the conductive layers 7 and 7' from the environment thereby eliminating or minimizing the potential for undesirable shorting or arcing of the charged conductive layer to surrounding conductive objects. The dielectric layers 11 and 11' can comprise the same or different materials and thickness. Furthermore, in general, the dielectric layers 11 and 11' can be the same material or a different material than that comprising the substrate membranes 2 and 2'.

Figure 7A:
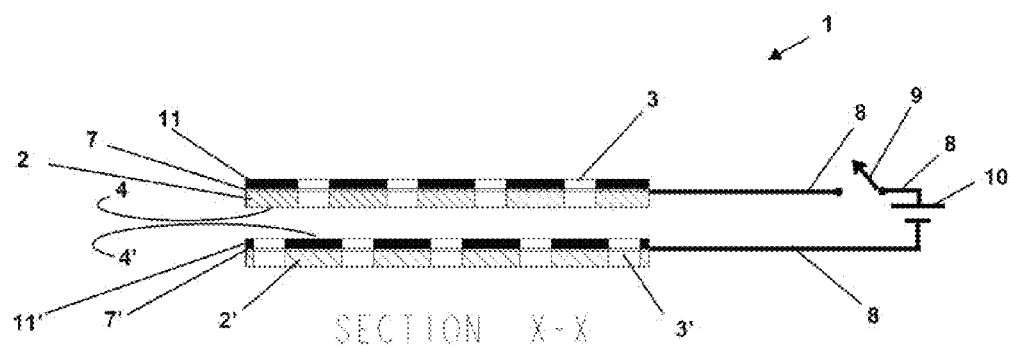
FIG. 7 is a schematic diagram of a sectional view of alternative configurations of an adaptive membrane structure comprising two substrate membranes, two conductive layers, and two dielectric coatings.

In some embodiments, when the dielectric layer is positioned to face the adjacent membrane as in FIGS. 6 and 7, an added function of the dielectric layer can be to enhance the seal formed when the membranes come in contact as a result of application of the actuating stimulus. In particular, as illustrated in the examples below, a coating comprising a compliant dielectric material such as an elastomer is especially suited to provide a compliant surface to enhance sealing of the membrane surfaces in contact under action of the actuating stimulus.

Figure 7B:
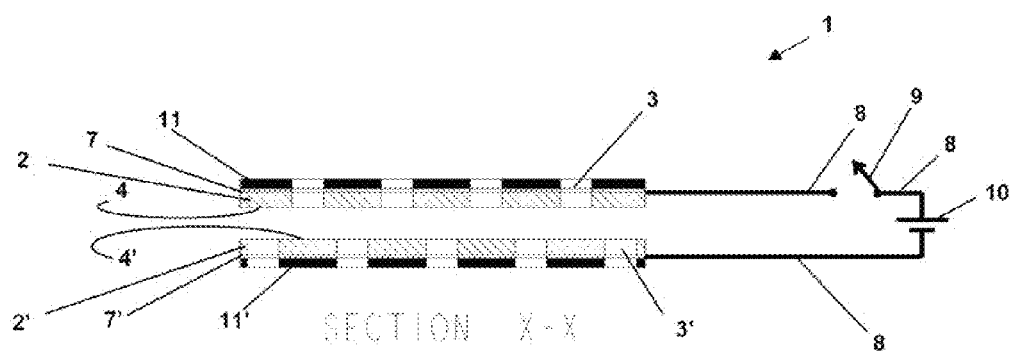

In certain embodiments, a conductive layer 7, and a dielectric layer 11 if present, can be installed on the side of a membrane 2 that will not come into contact with another membrane 2'. This embodiment is shown in FIG. 7B.

Yet another function of the dielectric layer may be to adsorb, absorb, or react with harmful and undesired species that may diffuse into the membrane structure when the membrane is in the unactuated state. Hence, the dielectric layer can include activated carbon, high surface silica, molecular sieves, xerogels, ion exchange materials, powdered metal oxides, powdered metal hydroxides, antimicrobial agents, and the like, which can be in the form of nanoparticles if so desired.

Figure 8:
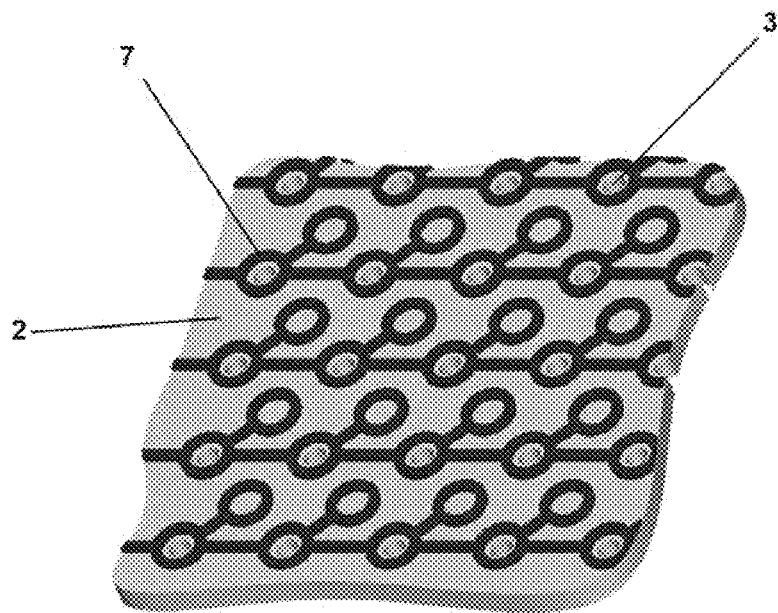
FIG. 8 is a schematic diagram of a substrate membrane of an adaptive membrane structure in which a conductive layer is applied to the substrate membrane in an annular pattern around each hole.
Figure 9:
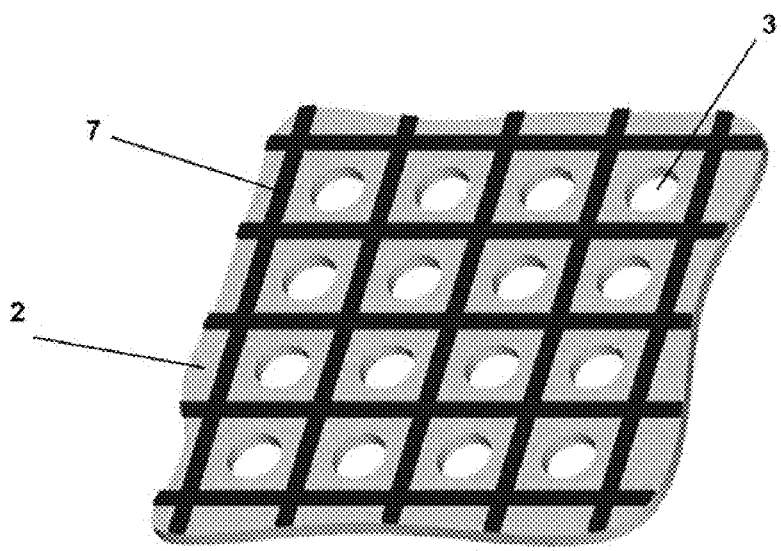
FIG. 9 is a schematic diagram of a substrate membrane of an adaptive membrane structure in which a conductive layer is applied to the substrate membrane in parallel lines.

In alternative embodiments, the conducting layers do not cover the entire surface of a substrate membrane but instead can be selectively applied in a pattern, which only partially covers the substrate membrane surface. One such example is shown in FIG. 8, in which a conductive layer 7 is applied to a substrate membrane 2 in an annular pattern around each hole 3. Another possible patterned electrode is shown in FIG. 9, in which the conducting layer 7 comprises two arrays of parallel electrically conducting lines applied to the substrate membrane 2 traversing the space between the holes. The use of a patterned conducting layer as shown in FIGS. 8 and 9, as opposed to a continuous electrode as shown in FIG. 4, can increase the desirable permeability of the structure in the actuated state to species such as water vapor, since the barrier afforded by the electrode material to transport of these desirable species is removed over much of the substrate membrane surface. The method for laying down conductive features, lines and patterns onto surfaces is well known in the electronic manufacturing art. Several additional variations of lithographic printing for laying down micron and submicron conductive features onto surfaces are also well known in the art.

Figure 10:
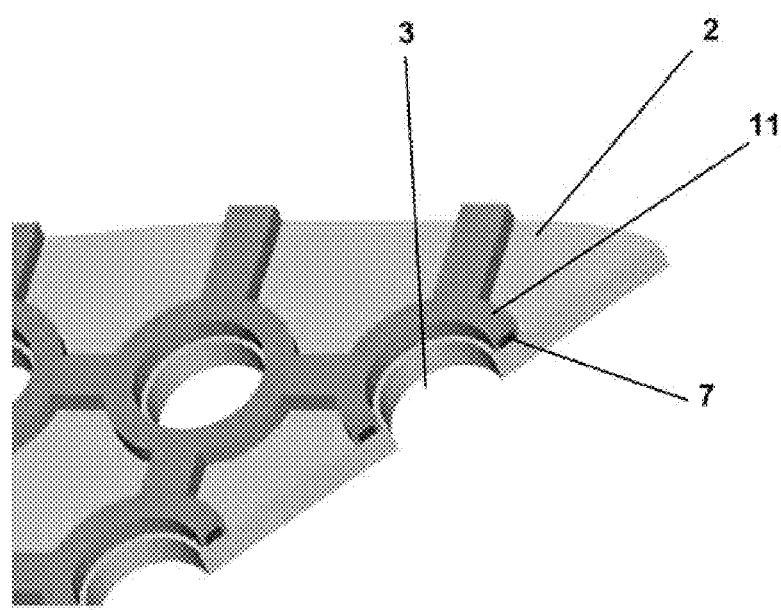
FIG. 10 is a schematic diagram of a portion of a substrate membrane of an adaptive membrane structure in which a patterned dielectric layer is applied to a patterned electrode layer applied to a substrate membrane.

Dielectric layers, if they are incorporated in the structure as disclosed above, also need not cover the entire surface of the substrate membrane. In particular, if a patterned electrode is used, a patterned dielectric layer may be used which covers the patterned electrodes to electrically isolate them from their surroundings, but the dielectric layer need not cover all of the remaining substrate surface, which is not covered by the patterned electrode layer. FIG. 10 shows an example of a patterned dielectric layer 11 applied to a patterned electrode layer 7 applied to a substrate membrane 2 in a similar design.

The adaptive membrane structures disclosed herein are not limited to adaptive membrane structures having only two substrate membranes. For example, FIGS. 11A, 11B and 11C show an adaptive membrane structure comprising three substrate membranes 2, 2' and 2"; conducting layers 7, 7' and 7"; and associated dielectric layers 11, 11' and 11".

Figure 12A:
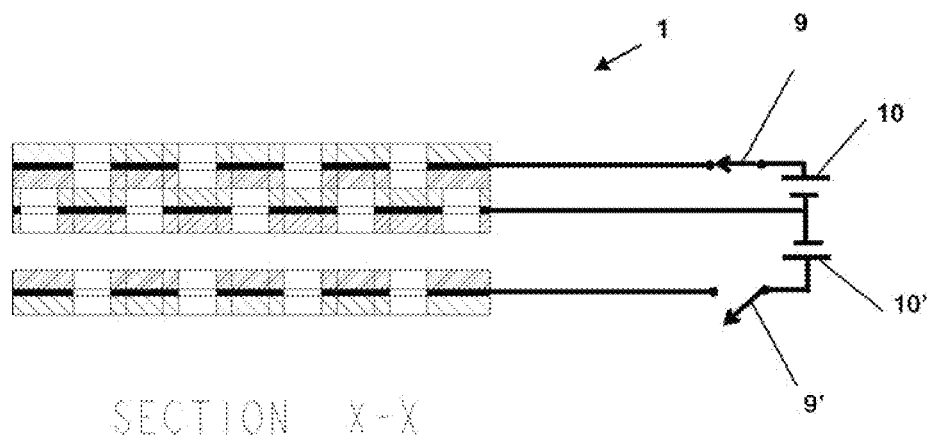
FIG. 12 is a schematic diagram showing a sectional view of three possible states of actuation of an adaptive membrane structure comprising three substrate membranes, three conductive layers, and three dielectric layers.
Figure 12B:
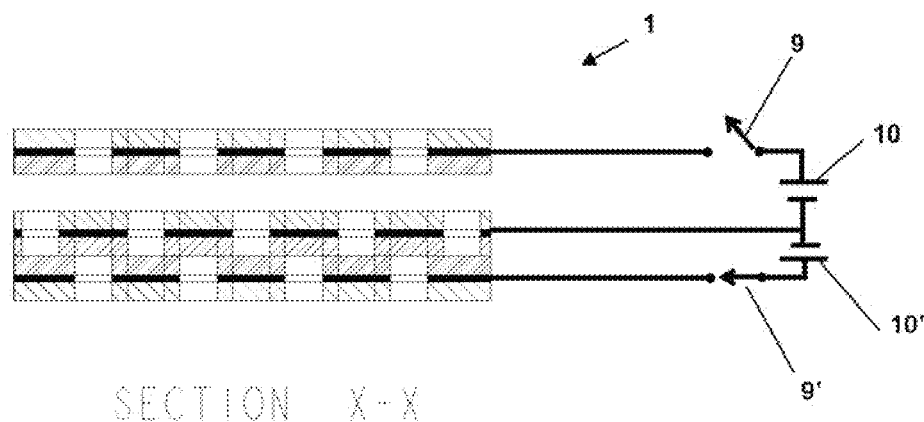
Figure 12C:
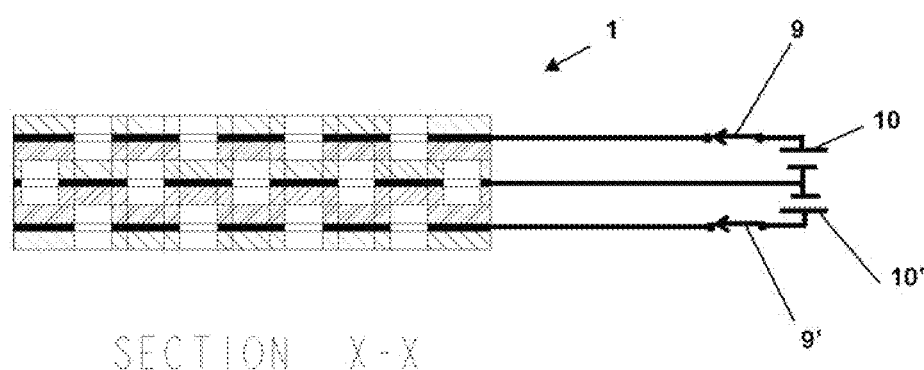

Two potential sources 10 and 10', switches 9 and 9', and conductors 8 are provided to permit electrostatic actuation of the conductors in the system. Thus, three different actuation states can be achieved with this system by closure of switch 9, 9', or 9", as shown in FIGS. 12A, 12B, and 12C respectively.

Figure 11A:
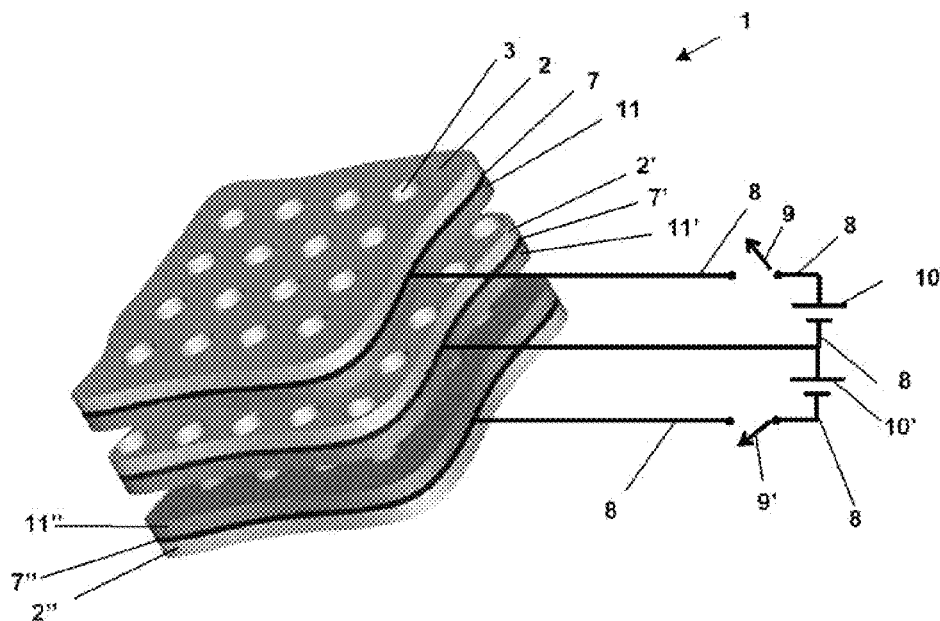
FIG. 11 is a schematic diagram of an adaptive membrane structure comprising three substrate membranes, three conductive layers, and three dielectric layers. (11A: perspective view. 11B: plan view. 11C: sectional view.)
Figure 11B:
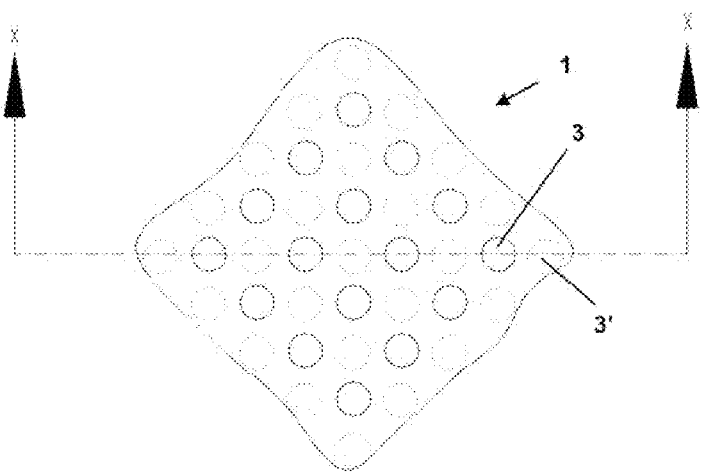
Figure 11C:
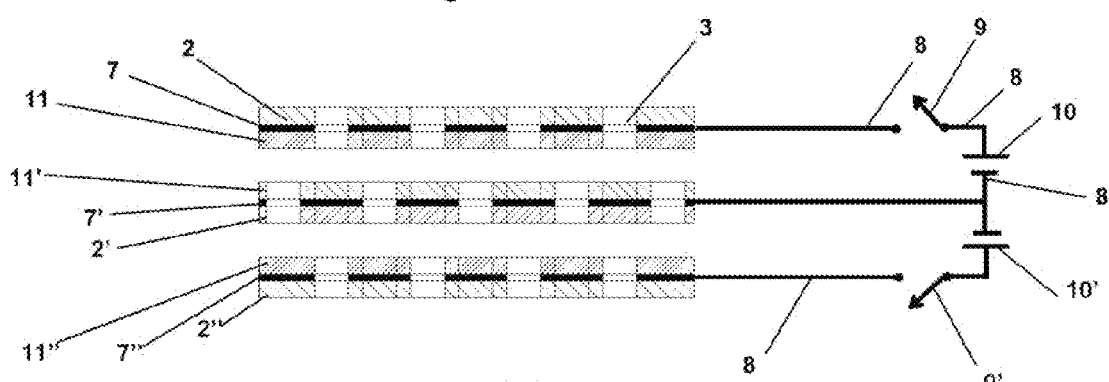

The design disclosed in FIGS. 11A, 11B and 11C can be extended to four or more membranes. Multiple membrane systems enable adaptive barrier systems, which can selectively impede the passage of different chemical, biological and/or other particulate species by actuating different combinations of adjacent membrane closures. Such systems can include, in addition to one or membranes in addition to two that are brought into contact, one or more layers of fabric.

Although an applied electric field is a preferred form in which the actuating stimulus will operate, there are numerous other types of actuating stimuli that are useful for the purpose of causing the movement of membranes in the adaptive membrane structures disclosed herein. Other possible actuating stimuli include without limitation a magnetic force, hydrostatic force, or hydrodynamic force, and two or more different kinds of actuating stimuli may be used on a membrane structure.

For example, certain polymers can absorb considerable amounts of water and other solvents, and can thereby swell to volumes that are significantly greater than the original dry volume. In so doing, the expansion and change of dimension of such a swellable polymer can transmit a hydrostatic force that would cause membrane movement.

Changes in temperature can also serve as another form of an actuating stimulus. Certain synthetic materials, naturally-occurring materials and engineered structures can generate significant forces as they change their dimensions in response to changes in temperature. Such a gain or loss of thermal energy can thus also be used to cause the movement of membranes herein, working through the material as its size is changed thereby.

In another embodiment, an electrostrictive material can be used to transmit a force derived electrically. An electrostrictive material, when subjected to electrical voltage, can undergo size deformation, with a consequent change in dimension, which can produce a force that will transmit the effect of the actuating electrical stimulus and move a membrane.

An embodiment based on the use of a magnetic force as the actuating stimulus can be configured by incorporating a spiral or helical winding of a conducting wire (e.g. copper wire) in the adaptive membrane structure so that the winding is adjacent to the membranes in the structure and oriented such that the axis of the winding is normal to the plane of the membranes. The winding is electrically connected in series with a switch and a source of electrical power such as a battery. A magnetic material is incorporated in one or more of the membranes in the structure, and the membranes are appropriately located within the structure such that their motion under action of the force of magnetic attraction will cause them to come in contact with each other or with one or more other adjacent membranes. The magnetic material can be incorporated within the bulk of a membrane or as a coating on a membrane surface. Possible magnetic materials include carbonyl iron particles dispersed within the bulk of a membrane or within a matrix comprising a coating on a membrane surface. Upon actuation of the system by closure of the switch, a magnetic field will develop in the vicinity of the winding, and this field will generate a force on the magnetic material incorporated in one or more membranes thereby causing the membrane(s) containing the magnetic materials to come in contact with one or more adjacent membranes.

The embodiments disclosed above also illustrate a corresponding variety in the means that is provided to respond to the actuating stimulus, examples of which included above are a swellable polymer, a material that changes size in response to temperature change, an electrostrictive material and a magnetic material. Also suitable for use as means responsive to an actuating stimulus is a thermoelectric material, which can generate electrical energy when subjected to a change in temperature, and thus transmit to membranes the force a useful voltage that is representative of a gain in thermal energy.

The means responsive to the actuating stimulus are typically located in, on, within or adjacent to the adaptive membrane structure, in close enough physical proximity to enable application of the force of the actuating stimulus to move at least one membrane. A conductor or magnetic particles can, for example, be printed on a membrane that has holes, can be printed on another membrane or layer that does not have holes, or can be formed itself as a separate membrane or layer. Further, a polymer or layer that changes shape and/or size can be located adjacent to a membrane that has holes, although other membranes or layers that do not have holes can be located there between provided that the mission of the polymer or material to apply a moving force to the membrane with holes is not hindered.

In view of the variety of forms of the actuating stimulus, as disclosed above, in some embodiments the adaptive membrane structure includes first and second movable membranes, and means to respond to an electrical, a magnetic, a hydrodynamic or a hydrostatic force. These embodiments also enable, in a membrane structure that includes first and second movable membranes, a method for moving the first membrane toward the second membrane by applying an electrical force, a magnetic, a hydrodynamic or a hydrostatic force to the first membrane.

Whatever form the actuating stimulus takes, it operates in one embodiment to a substantially uniform extent on all portions of at least one membrane. In such embodiments, the entire membrane preferably moves as a result of the application of the actuating stimulus.

In other alternative embodiments, the actuating stimulus does not operate to a uniform extent on all portions of the membrane, and one or more portions of one membrane are moved into contact with a corresponding portion or portions of another membrane in a position in which the holes of each portion of the first membrane are substantially out of registration, or are out of registration, with the holes of the corresponding portion of the second membrane.

In particular, the adaptive membrane structure disclosed herein can be designed to display multiple states of gas, vapor and/or liquid permeability in addition to and different from those exhibited when the adaptive membrane structure is in the fully actuated, fully unactuated or fully deactuated state. In one embodiment, an adaptive membrane structure can be formed to have two or more portions or subsections, where each subsection of the structure is itself an adaptive membrane structure that displays some or all the features disclosed herein. The permeability of the structure as a whole can be altered by changing the permeability of some or all of the subsections of the structure, and by doing so at different times. An actuating stimulus can be applied to each subsection of the membrane structure independently of all the other subsections. Hence, several different states of permeability can be obtained for the structure as a whole by moving membranes in some of the subsections, while not moving membranes in other of the subsections, that together make up the adaptive membrane structure as a whole. In another embodiment, however, all membranes in all subsections can be moved at the same time.

Figure 20:
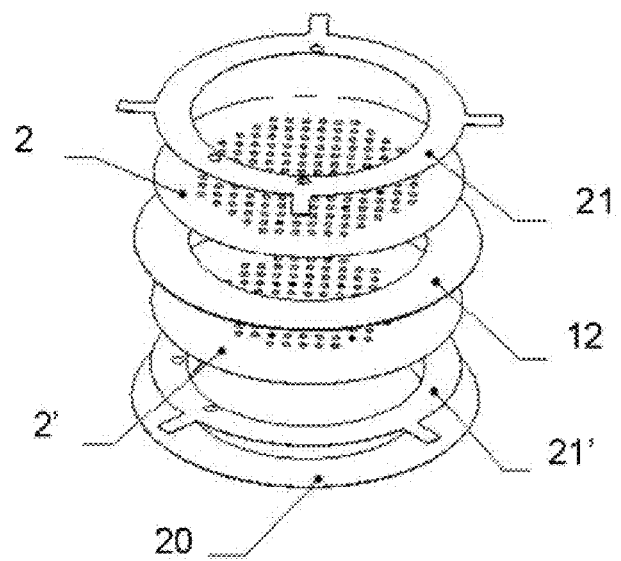
FIG. 20 is a schematic diagram of a circular adaptive membrane to be used as one module in the assembly of a flat-panel adaptive membrane structure. An exploded view and an assembled view are shown.
Figure 20:
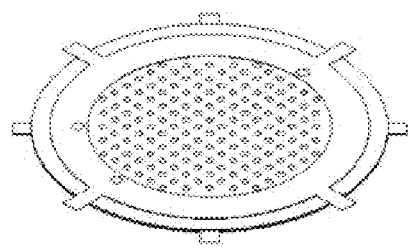

One example of an adaptive membrane structure that has several such subsections is illustrated in FIG. 20. The figure shows a plan view of a membrane that has four subsections, and each subsection consists of an array of holes. Two or more membranes such as the membrane illustrated in FIG. 20 can be provided in the structure such that the array of holes in each subsection of one membrane are substantially out of registration, or are out of registration, with the array of holes of the corresponding subsection on another adjacent membrane. A separate actuating stimulus, and means responsive thereto, can be provided for each subsection of a membrane. By assembling the membrane illustrated in FIG. 20 with at least one and possibly more corresponding membranes and with appropriate spacers, and by connecting the resulting adaptive membrane structure to an appropriate electrical circuit, it is possible to apply an actuating stimulus to any one, any two, any three or all four of the subsections of the membrane structure. At least 5 different states of permeability for can be obtained using such an adaptive membrane structure with four subsections. The membrane of FIG. 20 is shown having four similar subsections. However, such similarity is not required.

Figure 13A:
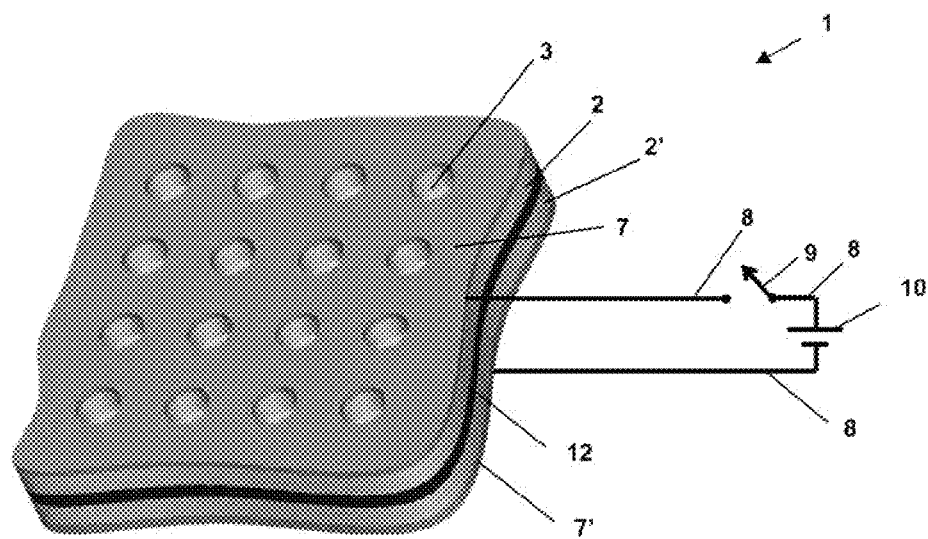
FIG. 13 is a schematic diagram of an unactuated adaptive membrane structure that includes a spacer material as a deactuation means. (13A: perspective view. 13B: plan view. 13C: sectional view.)
Figure 13B:
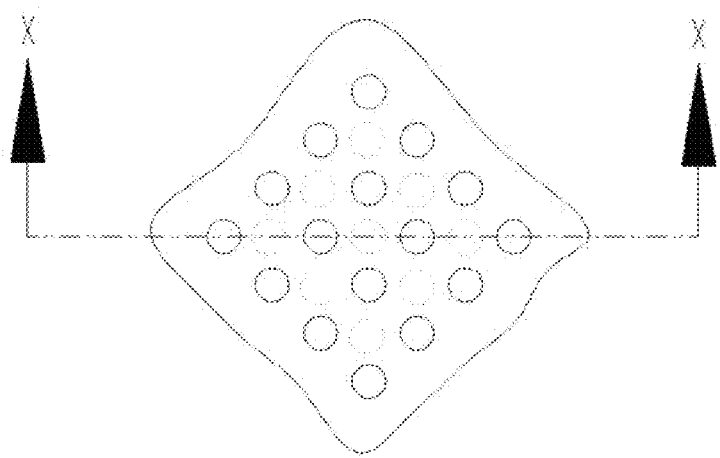
Figure 13C:
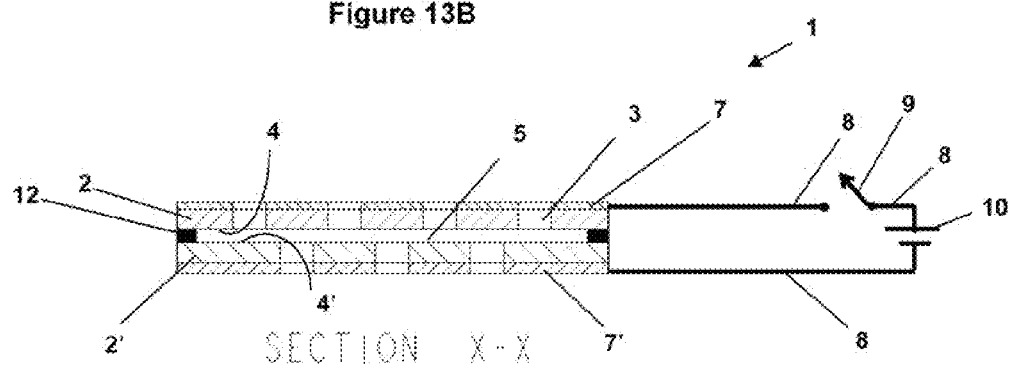
Figure 14A:
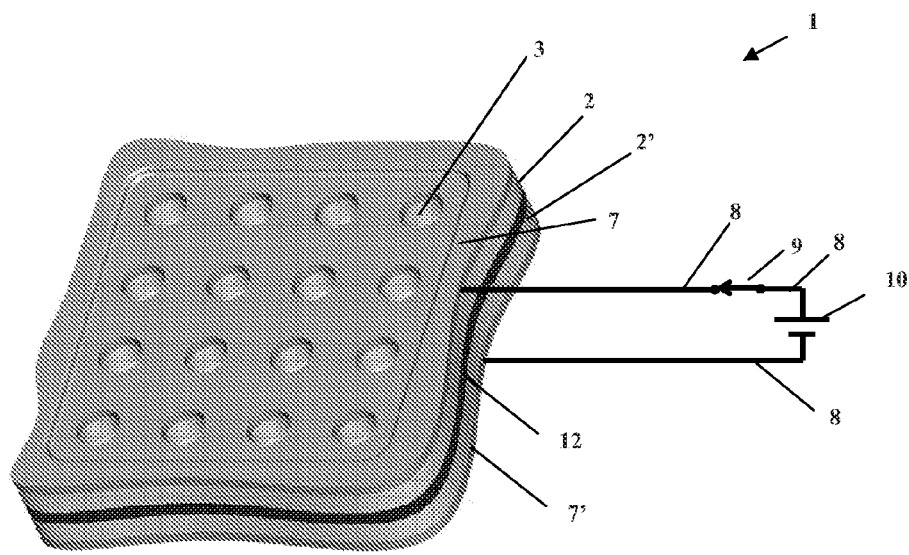
FIG. 14 is a schematic diagram of an actuated adaptive membrane structure that includes a spacer material as a deactuation means. (14A: perspective view. 14B: plan view. 14C: sectional view.)
Figure 14B:
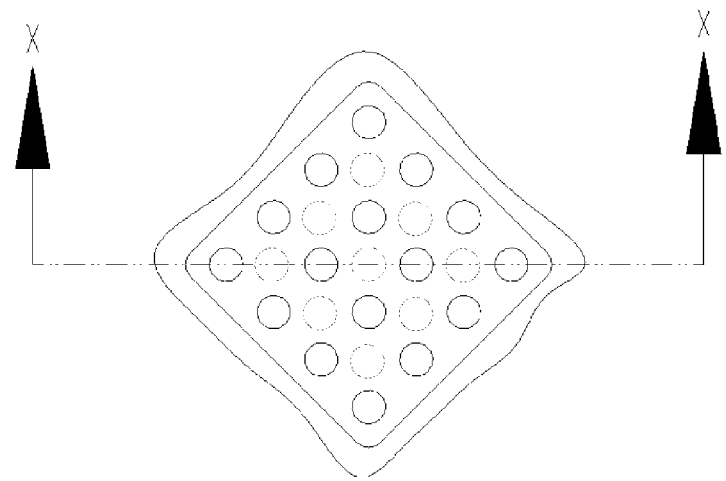
Figure 14C:
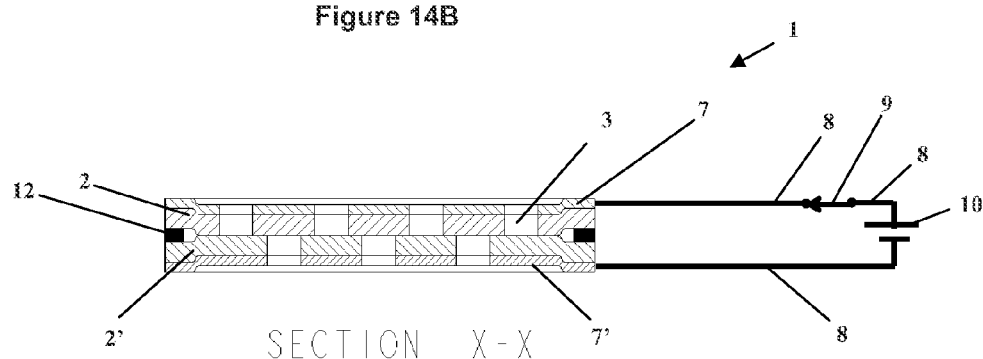

A further feature of the adaptive membrane structure is a means of keeping adjacent membranes spaced apart during any time when the actuating stimulus is not applied or operating to move the membranes into contact with each other ("deactuating means"). This will produce a gap between the adjacent surfaces of the membranes to enable permeation through the structure as disclosed above. In FIGS. 13A and 13C, a gap 5 between adjacent surfaces 4 and 4' is shown, and a spacer material 12 is installed between the adjacent membrane surfaces 4 and 4', the spacer material being of a shape that it does not block the openings to any holes of either membrane surface and has a thickness that results in the formation of the gap between the adjacent membrane surfaces. Upon application or operation of the actuating stimulus, one or both of the adjacent membranes undergo elastic deformation as depicted in FIGS. 14A, 14B and 14C such that the adjacent surfaces are brought together to provide contact between the adjacent surfaces and seal the holes thereof, in the manner disclosed above (compare items 7 and 7' in FIGS. 13C and 14C). Upon release of the actuating stimulus, however, the elastic energy stored in the deformed membranes is recovered, and the membranes return to their initial position as shown in FIGS. 13A, 13B and 13C whereby the gap 5 between the adjacent membrane surfaces is restored.

Embodiments of the present invention as disclosed above, for example those shown in FIG. 1, involve at least two largely planar membranes that, as a result of being moved by the actuating stimulus, contact each other along adjacent, largely planar, surfaces 4 and 4' and thereby eliminate a gap 5 that had existed between these surfaces in the unactuated state. The contact of the membranes also eliminates paths such as path 6 that, in the unactuated state, would permit enhanced permeation, convection and/or diffusion associated with the array of holes incorporated in the base membranes.

Articles comprising the adaptive membrane structures disclosed provide environmental protection to a human, animal, or object enclosed by the article. As used herein, the term "enclosed by the article" indicates that the article is being worn as a garment or is an enclosure (e.g., a tent or building or container) large enough to contain that which is to be protected; it does not require that the protected being or object is completely encased. The article will have "exposed area," i.e., the area of the article that is exposed to (equivalently, in contact with) the surrounding environment. The size of the exposed area will vary based on the application. For example, the exposed area of a protective garment for a human adult may be in the range of about 30-40 $ft^2$ (2.8-3.7 $m^2$). A collective protection enclosure such as a tent may have an exposed area greater than 200 $ft^2$ (18.6 $m^2$). For a residential building application, the exposed area could be as small as 500 $ft^2$ (46.5 $m^2$) or as large as 10,000 $ft^2$ (929 $m^2$). The exposed area will depend on the size of the home and whether whole building or only parts need to be protected. For a commercial building application, the exposed areas could be 100,000 $ft^2$ (929 $m^2$) and possibly higher. The exposed area will depend on the size of the building and whether it is desired to protect parts of the building (e.g., the roof) or the entire building. As one can see, there is a very large range of exposed areas that could be protected by using adaptive membranes. Generally, the adaptive membranes structures disclosed herein are used to protect such exposed areas are greater than or equal to about 1 $ft^2$ (0.09 $m^2$) in area.

Figure 18:
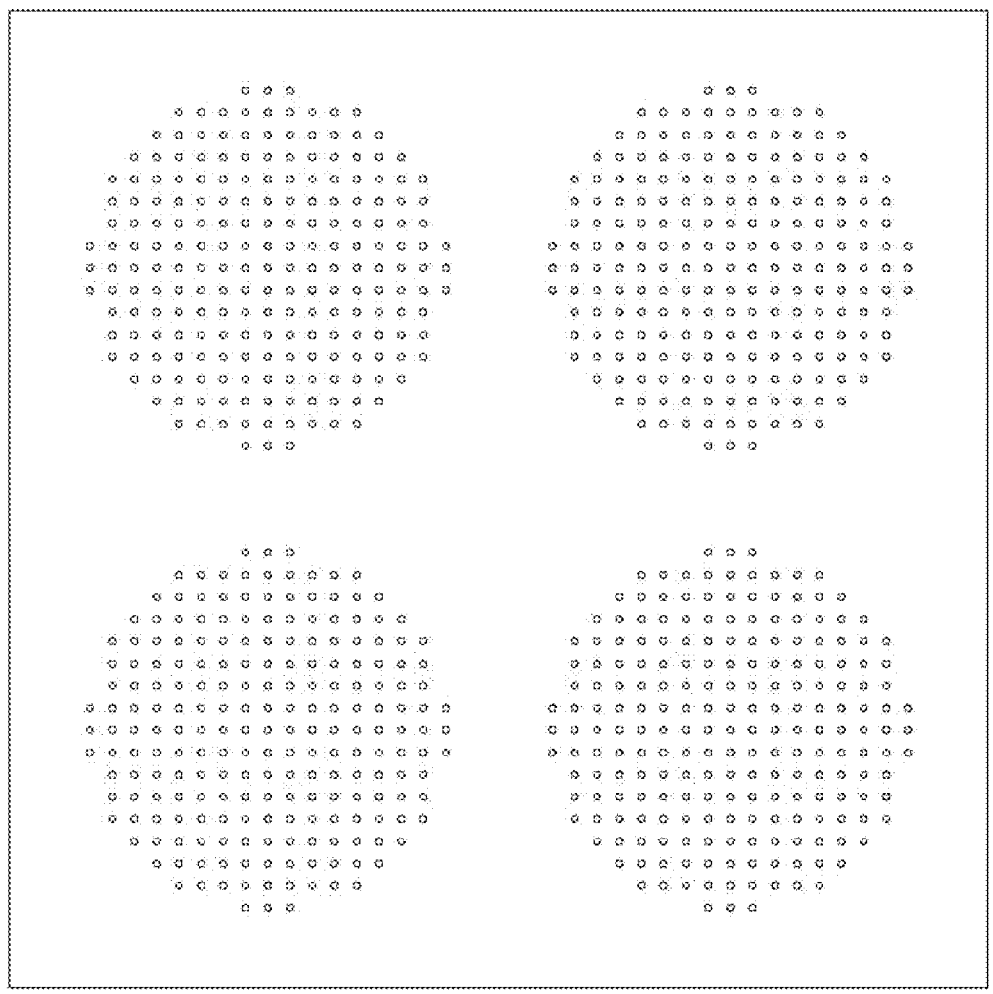
FIG. 18 shows a plan view of an article having four adaptive membrane structures of circular cross-section.

The entire exposed area or only a part of the exposed area can comprise one or more adaptive membranes as disclosed herein. FIG. 18 illustrates an embodiment where only part of the square exposed area includes adaptive membranes. The four circular regions represent four adaptive membrane structures. The percent of the exposed area that is protected (or, equivalently, "covered") by adaptive membranes can be calculated by summing up the areas of the individual adaptive membrane structures, dividing by the total exposed area, and multiplying the result by 100:

The required percent covered area will be dictated by the needs of the specific application. In some embodiments, the covered area will be at least about 10%. Where a particularly high level of protection is required, the covered area may approach 100%. For example, for chemical and biological protective apparel, it would be desirable to provide a high level of breathability and water vapor permeability for comfort to the wearer. Therefore the designer of the protective apparel may strive to maximize the percent covered area to enhance comfort of the suit when it is in the unactuated state. Alternatively, the designer may prefer to use adaptive membranes to cover a portion of the exposed area, enough to provide breathability, and a more rugged barrier material (for example, butyl rubber) to cover the remaining exposed area. Similarly, if the adaptive membranes were to be used to control the water vapor transport in and out of building envelopes, the optimal percent covered area would depend on the nature of specific building application.

Figure 19:
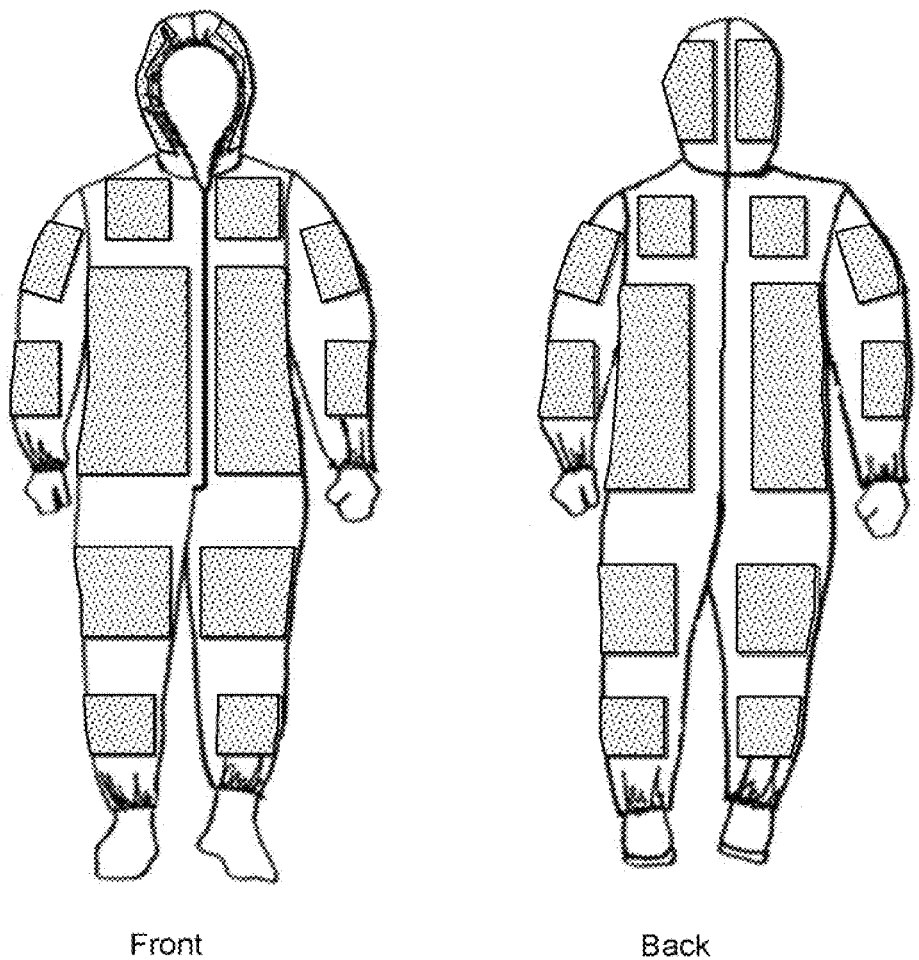
FIG. 19 is a schematic diagram of a protective garment, wherein the shaded rectangular sections represent adaptive membrane structures.

The adaptive membranes may or may not be uniformly distributed over the entire exposed surface area. In addition, the adaptive membrane areas need not be all of the same size. In FIG. 18, the four circular adaptive membranes are of the same area and are uniformly distributed. However, for protective apparel, for example, it may be desirable to have the adaptive membrane areas of different sizes and distributed non-uniformly over the entire exposed area. FIG. 19 is a schematic diagram of a protective garment, wherein the rectangular shaded regions represent adaptive membrane structures. In this embodiment, the apparel designer chose not to place the adaptive membranes over certain parts of the body because of the complexity in the curvature of a human body. For example, a designer may choose not to place active areas over the shoulder regions, and over the knees and elbows and behind the knees and elbows. The adaptive membranes also vary in size and shape to conform to the needs of the garment design. In contrast, an architect who is designing a building enclosure may choose to place adaptive membrane structures uniformly throughout the entire surface area because of the ease of fabrication and installation over the walls of the building.

Those skilled in the art will recognize that the transport properties of the adaptive membranes disclosed herein are not only affected by the percent coverage and the uniformity of distribution of the adaptive membranes but also to a great extent by the total porosity of the membrane. In an embodiment of the adaptive membrane structures disclosed herein, the porosity is distributed. In FIG. 20, the exposed area is a square area. The four circular regions represent four adaptive membrane structures. The total porosity of the article is the volume of the holes in the adaptive membrane structures divided by the volume of the article. If, as in FIG. 18, the exposed surface includes the holes and the holes have a uniform cross-sectional area (e.g., are right cylinders), then the porosity of the article simply equals the total cross sectional area of the holes divided by the total exposed surface area.

The diffusive mass transfer across any porous membrane is directly proportional to the porosity of the membrane. Likewise, for the adaptive membranes disclosed herein, mass transfer under diffusion conditions is affected by the porosity of the membrane. However, diffusion is not the only mode for heat and mass transfer across membranes. Under certain conditions, mass transfer by convection can outweigh mass transfer by diffusion and in those cases convection can become the dominant mode of transport. When convection becomes dominant, as in a garment, small amounts of porosity can have a very large effect on the amount of mass transferred across a membrane. This was observed in a recent research study undertaken to relate the effect of garment porosity on critical heat stress (Thomas E. Bernard, Candi D. Ashley, Joseph D. Trentacosta, Vivek Kapur, Stephanie M. Tew "Critical heat stress evaluation of clothing ensembles with different levels of porosity," *Ergonomics*, in press). Thomas Bernard and coworkers showed that at low garment porosity values, ranging between 0 and 2%, there is a directly proportional relationship between critical wet bulb globe temperature, which is a measure of evaporative cooling, and garment porosity. As evaporative cooling increases, heat stress decreases. Thus, Bernard et al. showed that increasing garment porosity, even only from 0% to 2%, leads to a statistically significant reduction in heat stress. Beyond a porosity of 2% up to a porosity of 20% there is no further increase in evaporative cooling. Thus, in one embodiment, the protective articles disclosed herein will have a total porosity that is greater than or equal to about 0.5%. When the membrane structure is actuated, the porosity will be reduced to a lower level to provide the desired protection.

The adaptive membrane structures disclosed herein can be used as components of articles of apparel, especially for clothing intended to protect against chemical and biological toxins and pathogens. Such articles include protective suits, protective coverings, hats, hoods, masks, gowns, coats, jackets, shirts, trousers, pants, gloves, boots, shoe, shoe or boot covers, and socks.

The adaptive membrane structures disclosed herein can also be used in consumer apparel to protect against the natural elements. In one embodiment, the structure can be used as an inner liner in responsive outerwear apparel used for recreational and other outdoor activities, such that the liner can be made to change its permeability depending upon external temperature and wind conditions, to increase the comfort of the wearer. Examples of such outerwear include coats, jackets, ski pants, gloves, hats, hoods and masks. In another embodiment, an adaptive membrane structure can be used as a responsive liner in raingear. In dry external conditions, the liner can be highly permeable, thus breathable, but in wet and rainy conditions, the liner can be made impermeable to external precipitation.

The adaptive membrane structures disclosed herein can be used for various medical applications. In one embodiment, the structure can be used to fabricate items of apparel for health care workers, including for example, surgical masks, medical or surgical garments, gowns, gloves, slippers, shoe or boot covers, and head coverings.

For some of the aforementioned applications, the adaptive membrane structures can be used in the absence of any additional porous material layers, while for some other applications a multi-layered system can be created where the adaptive membrane structure forms only one component in the multi-layered system. Examples of porous layers that can be used in conjunction with the adaptive membrane structure are woven fabrics, non-woven films and porous membranes. Additional porous layers can be used with the objective of (i) creating a composite system that protects the adaptive membrane structure from an environment that may degrade its performance, and/or (ii) creating a composite system that has more features than those that can be offered by the adaptive membrane structure itself.

For example, for the purpose of creating fire retardant apparel that also protects a firefighter from noxious fumes and vapors, the adaptive membrane structures disclosed herein can be layered with or sandwiched between fire retardant fabrics. The outer fire retardant fabric then protects the wearer and the adaptive membrane structure from the fire. For the purpose of creating commercial apparel that protects against the natural elements, the adaptive membrane structure can be sandwiched between woven fabrics. The outer and the inner fabric can be chosen to impart a comfortable feel as well as to provide a fashionable appearance to the apparel. Colored and patterned fabrics can also be used as outer layers to introduce additional camouflage feature to chemical and biological protective apparel for a soldier. In some cases, microporous membranes can be used to protect the adaptive membrane structure from dust and liquids.

An adaptive membrane structure as disclosed herein can be incorporated into an article of apparel by any of the knitting, sewing, stitching, stapling or adhering operations known in the art. It is common in the art to use fabrics or other materials having multiple layers from which to make apparel, and the adaptive membrane structure disclosed herein can be incorporated therein by conventional methods.

The potential uses of the adaptive membrane structure n are numerous and are not limited to protective apparel for humans. In other embodiments, the adaptive membrane structure can be used to create or construct an enclosure for the occupancy of humans, animals or perishables. Such enclosures include, for example, collective shelters, such as tents, that protect groups of individuals against chemical and biological warfare agents. In another embodiment, the adaptive membrane structure can be used to set up safe rooms in commercial and residential buildings. For example, the safe rooms assembled using the adaptive membrane structure can be made to be permeable under non-threatening conditions and impermeable when toxic agents are released in the external environment.

The adaptive membrane structures can also be used to create an external water barrier layer in the construction of commercial and residential buildings such as dwellings and office buildings. The vapor barrier, or vapor-retardant layer, in a building is desirably impermeable enough to prevent precipitation from outside of the building to permeate inside, but breathable enough to allow excess moisture in the walls to permeate to the outside. Therefore, in one embodiment, the adaptive membrane structure can be used as a responsive vapor barrier in commercial and residential buildings such that the barrier layer can exist in multiple states. When there is excess moisture in the building walls, the barrier layer can be made vapor permeable, and when there is high humidity in the external environment, the barrier layer can be made impermeable.

Adaptive membrane structures as disclosed herein, when constructed from transparent polymer films, can also be used to construct agricultural and horticultural greenhouses. Temperature control in a greenhouse is an important issue for optimum plant growth. Existing greenhouses are constructed from polymer films of low gas and vapor permeability. Since such polymer films are not breathable, the temperature in a greenhouse is conventionally controlled by the opening and closing of engineered vents. This often leads to undesirable temperature gradients in the greenhouse. If an adaptive membrane structure is used to construct the greenhouse, the internal temperature can be more evenly controlled by changing the permeability of the membrane that envelops the greenhouse. As the temperature in the greenhouse rises, the membrane can be made more permeable, thereby allowing the process of free convection to reduce the temperature in the greenhouse. Similarly, as the temperature in the greenhouse falls, the membrane can be made less permeable, allowing the temperature in the greenhouse to rise.

In yet another embodiment, an adaptive membrane structure can be used in temporary, soft-walled construction, or in permanent construction, to create a clean room in which to perform surgical procedures, or in which to conduct activities requiring high air purity such as computer chip fabrication.

The adaptive membrane structure can also be used for managing the environment in small and large storage areas and containers such as those used for storing perishables, which include not just edible materials but any material that is sensitive to, or may be damaged or degraded by exposure to, the environment. For example, edible materials such as fresh fruits and vegetables may need to be stored under optimum humidity levels to maintain freshness and enhance their shelf life. Adaptive membrane structures can be used to create storage areas or storage containers that respond to the local environment conditions. For example, when the local water vapor concentration in the stored area is above the desired level, the adaptive membranes can be deactuated to release excess water vapor to the surrounding environment, and actuated once the water vapor drops below the desired level. Such responsive storage devices can be used to ship edible materials or other perishables from one place to another or to store them in commercial and residential settings such as cold storage areas and refrigerators.

Adaptive membrane structures can also be used to enhance the life and performance of a sensor device, and in this sense a sensor device may be viewed as a perishable. The active components in a sensor device are very sensitive to their environment and can be poisoned by liquid or vapor or particulate species in the environment. Such devices can also be corrupted when exposed to high concentrations of the species they are designed to sense. In one embodiment, an adaptive membrane structure, by its ability to have different states of permeability in the actuated and the deactuated states, can be used to control the flow of species to an enclosure housing the active component of a sensor. In another embodiment, an adaptive membrane structure can be used as a protective layer or a shroud around the active component. When it is desired that the sensor be in the active state for sensing, the adaptive membrane structure can be left in the unactuated state allowing the active component of the sensor to come in contact with species in the environment that need to be sensed. But when the sensor is no longer in the active or sensing state, the adaptive membrane structure can be deactuated to the closed state thereby protecting the active component of the sensor and enhancing its life.

The use of an adaptive membrane structure in connection with physical assets or devices such as enclosures, buildings, sensors and valves can be achieved by fabrication and construction methods known in the art. The adaptive membrane structure can be interleaved between other layers or structural elements such as when a building wrap is installed between the interior and exterior portions of a wall. When the adaptive membrane structure is used in an essentially free-standing application such as in a tent, greenhouse, valve or protective cover for a sensor, installation can be achieved by anchoring the adaptive membrane structure to a suitable frame.

EXAMPLES

The present invention is further defined in the following examples. It should be understood that these examples, while indicating preferred embodiments, are given by way of illustration only. From the above discussion and these examples, one skilled in the art will be able to ascertain the essential characteristics of this invention, and, without departing from the spirit and scope thereof, will be able to make various changes and modifications to adapt it to various uses and conditions.

Method for Testing Adaptive Membrane Structure Performance.

In the Examples, the multiple states of permeability of the adaptive membrane structures were demonstrated by measuring the ratio of the oxygen permeability in the unactuated state and the actuated state.

Figure 15A:
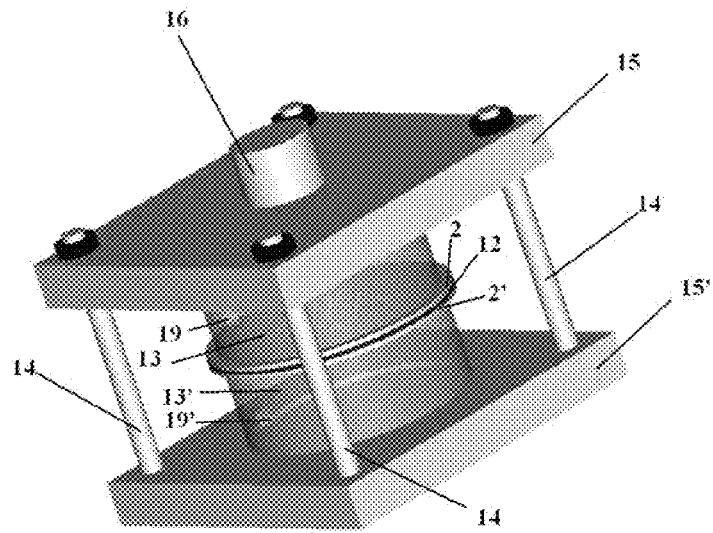
FIG. 15 is a schematic diagram of the cell used in measuring the oxygen permeability of the adaptive membrane structures (15A perspective, 15B section).
Figure 15B:
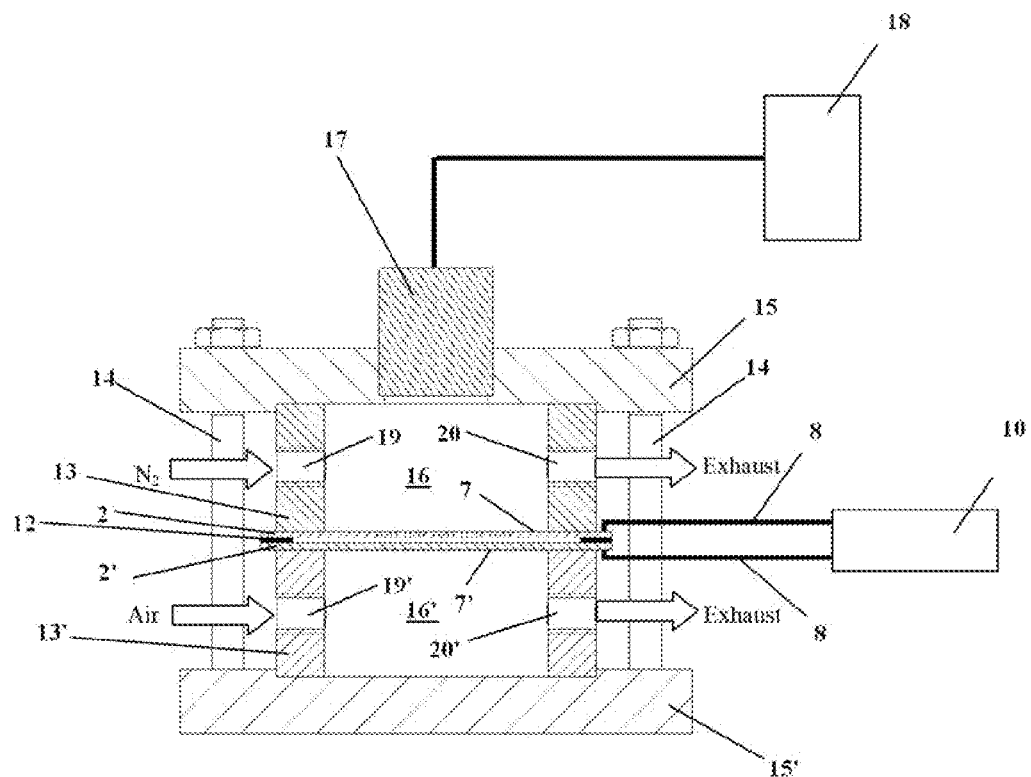

Oxygen ($O_2$) permeability of an adaptive membrane structure was tested in a gas permeability cell, a schematic of which is shown in FIGS. 15A and 15B. This system can be used to test any of the embodiments disclosed above. For this example, an adaptive membrane structure of the general type shown in FIG. 13 is depicted comprising two substrate membranes 2 and 2' each modified with an array of holes per the invention and with conductive coatings 7 and 7' and spacer material 12. The membrane assembly was clamped between two cylindrical, clear acrylic pieces 13 and 13' as shown in FIGS. 15A and 15B. The length of each cylindrical piece was 1" and its inner diameter and outer diameter were 2.25" and 3", respectively. The two cylindrical pieces were held together by a metallic frame comprising four metal tie rods 14 and two metal plates 15 and 15' that provided complete closure to the permeability cell except for gas ports as described below. The cylindrical pieces 13 and 13' together with the plates 15 and 15' and the adaptive membrane structure combined to define two gas volumes 16 and 16' as seen in FIG. 15B. An electrochemical oxygen ($O_2$) sensor 17 with associated electronics 18 (Model GC-501, VICI Metronics, Poulsbo, Wash.) capable of measuring $O_2$ concentrations in the range of 0.1-25 mol %, was mounted on one of the metal plates 15 such that the active surface of the sensor was exposed to the gas volume 16, thereby monitoring the $O_2$ concentration in this volume of the permeability cell; this volume is referred to herein as "the low concentration side of the permeability cell." The other gas volume of the cell, 16' (which does not have an $O_2$ sensor) is referred to herein as "the high concentration side of the permeability cell."

After the membrane assembly was mounted in the permeability cell, the two conductive coatings 7 and 7' were connected, via conductive electrical wires 8 fitted with alligator clips, to the output of a high voltage DC power supply 10 (Model SL10, Spellman High Voltage Electronics Corporation, Hauppauge, N.Y.) capable of delivering tunable but constant DC voltage between 100 volts and 10,000 volts. During the initial part of the test, when $O_2$ permeability of the membrane structure in the unactuated state was being measured, the power supply was not energized.

At the start of the test, designated as time zero, a flow of air (consisting of 20.9 mol % $O_2$) was initiated to the high concentration side of the permeability cell 16' through inlet port 19' and a flow of nitrogen ($N_2$ at 99.9% purity) was initiated to the low concentration side 16 of the permeability cell through inlet port 19. Each half of the cell also included an exhaust port (20 and 20' in FIG. 15B), each providing free discharge from its respective gas volume to ambient conditions. The flow rate of both gases was controlled by separate inline rotameters upstream of the inlet ports 19 and 19'. Care was taken to keep the flow rates of both gases to the two half cells the same and constant during an experiment. The $O_2$ concentration in the low concentration side of the cell 16 was then monitored over time. Before the start of each test, both halves 16 and 16' of the permeability cell always contained ambient air.

At the start of the experiment, when $N_2$ flow was initiated to the low concentration side of the cell 16, the air, and hence the residual $O_2$ present in the half cell, was displaced by $N_2$. Hence, the $O_2$ concentration in the gas volume 16 dropped with time, and after 15 minutes reached an essentially constant level dependent upon the permeability of the unactuated membrane structure. This constant $O_2$ level indicated that a steady state between the rate of influx of $O_2$, caused by the permeation of air through the membrane assembly to the low concentration side of the cell 16, and the rate of efflux of $O_2$ through port 20, caused by forced convection out of the low concentration side of the cell, had been achieved.

After 15 minutes elapsed from the start of the test, a known potential difference was applied across the conductive coatings 7 and 7' from power supply 10. For the initial few seconds after the voltage was applied to the circuit, a very small current in the range of a few microamperes was always detected by the ammeter installed in the high voltage source. After the first few seconds, current was no longer detected in the circuit thus indicating that the conductive coatings 7 and 7' had become saturated with electrostatic charge. The voltage source, and consequently the membrane structure connected to the source, was left in the actuated state for 15 minutes. During this time, the change in the $O_2$ concentration in the low concentration side 16 of the permeability cell was monitored. Once the membrane structure was actuated with the applied voltage, the oxygen concentration in the low concentration side of the cell 16 further dropped and reached a constant value depending upon the permeability of the membrane structure in the actuated state.

After the membrane structure had been in the actuated state for 15 minutes, the voltage source was turned off, and any residual charge in the circuit was drained to ground via the voltage source. After the voltage was turned off, the membrane structure was allowed to stay in the unactuated state for another 15 minutes, during which time the change in oxygen concentration in the low concentration side 16 of the permeability cell was monitored.

The performance of the adaptive membrane structure was then quantified by calculating the ratio of the $O_2$ permeability of the membrane assembly in the unactuated state to the permeability of the same membrane assembly in the actuated state. This ratio, referred to herein as the figure of merit of the membrane assembly, is calculated from the following equation $$\frac{K_{unactuated}}{K_{actuated}} = \frac{\left(\frac{x_1}{x_o - 2x_1}\right)_{unactuated}}{\left(\frac{x_1}{x_o - 2x_1}\right)_{actuated}}$$

where K is the oxygen permeability of the adaptive membrane structure, the subscript defines the state of the membrane structure (actuated or unactuated), $x_o$ is the concentration of $O_2$ in air, and $x_1$ is the concentration of $O_2$ in the low concentration side 16 of the cell when steady state has been achieved. This equation was derived by conducting a material balance of $O_2$ on both halves of the permeability cell and by assuming that the concentration of $O_2$ in the respective efflux gas streams at ports 20 and 20' is the same as that existing within the corresponding gas volumes 16 and 16' of the cell. This equation typically also provides an indication of permeability that is generally useful in all systems.

Example 1

Polyethylene terephthalate film, referred to herein as polyester film, sold under the trade name of Melinex® by DuPont Teijin Films, having a thickness of 196 gauge (0.00196"), was coated on one side with a thin layer of aluminum using a chemical vapor deposition process. The electrical resistance of a 2.5" long by 2" wide piece of aluminum-coated polyester film was measured using a two point probe apparatus. The resistance of the film was approximately 4 Ohms. The surface of the film that included the aluminum coating will be referred to as the conductive surface while the other surface that does not have the aluminum coating will be referred to as the non-conductive surface. Two circular (4" in diameter) pieces of this polyester film were converted to a pair of membranes following the invention by punching holes through the polymer film and the conductive coating thereof. The diameter of the holes was 0.04". Holes were punched using a VIPROS 345 turret punching machine manufactured by U.S. Amada Ltd. (Buena Park, Calif.). The direction of the punching was from the non-conductive surface of the polyester film towards the conductive surface. Hence any raised surface features caused by the punching process were predominantly on the conductive surface of the polyester film.

In the first membrane, a total of 84 holes were punched while in the second membrane 83 holes were punched. The hole pattern in both membranes was a regular square pitch pattern, with center-to-center distance between any two nearest neighboring holes being 0.111 inch. The hole pattern in each membrane covered 1"×1" square area in the central region of the circular film. A major difference between the two membranes was that the hole pattern in one membrane was offset from the hole pattern in the other membrane by a distance that was half of the center-to-center distance between neighboring holes. This offset was created in both the x axis and the y axis, where x and y axis are orthogonal to each other and exist in the plane of the membrane. Thus, when the two membranes were precisely laid on top of each other, all the holes in one membrane were out of registration with all the holes in the other membrane.

An adaptive membrane structure was created by sandwiching a spacer according to the invention (see FIG. 13) between the two membranes. In particular, the spacer was formed from a stack of two annular rings each ring having a thickness of 0.004" and an inner diameter and an outer diameter of 2.25" and 4", respectively. One function of the spacer was to create a finite gap between the membranes and to prevent them from touching each other in the absence of the application or operation an actuating stimulus. Another function of the spacer rings was to provide a deactuating force to the membrane structure when the voltage is turned off. The spacer rings were created from transparent polyethylene terephthalate films sold under the trade name of Mylar® by DuPont Teijin Films. The two membranes with conductive coatings and punched hole arrays were stacked such that their non-conductive surfaces faced each other, and consequently the conductive surfaces faced away from each other. This adaptive membrane structure was tested for oxygen permeability, in the unactuated and actuated states, as described above.

First, the oxygen permeability of the membrane assembly in absence of applied voltage was tested. After 15 minutes, a potential difference of 1000 V was applied across the two conductive coatings on the membranes. When the voltage was applied, the membranes were observed to move, indicating the effect of an actuating stimulus in the form of the induced voltage. The membrane structure was left in the actuated state for 15 minutes, and the change in the $O_2$ concentration in the low concentration side of the cell was monitored.

The voltage was then turned off, and any residual charge was drained from the membrane assembly. A few seconds after the voltage source was turned off, the membranes were observed to move apart, indicating the disappearance of the actuating stimulus that had previously moved the membranes towards each other. The membrane structure was left in the unactuated state for 15 minutes and the resulting change in the $O_2$ concentration was monitored.

At the end of this time period, an actuating stimulus was again applied to the membrane structure in the form of a 1000 V charge. This repetitive cycle of turning on and then turning off the DC voltage source, and consequently charging the membrane structure with 1000 V and then discharging it every 15 minutes, was performed two more times. Each time the voltage was turned on or off, motion of the membranes was observed. The cyclical change in $O_2$ concentration in the low concentration side of the cell, caused by cyclical changes in the voltage-induced permeability of the membrane assembly, was monitored over the entire duration of this experiment.

Figure 16:
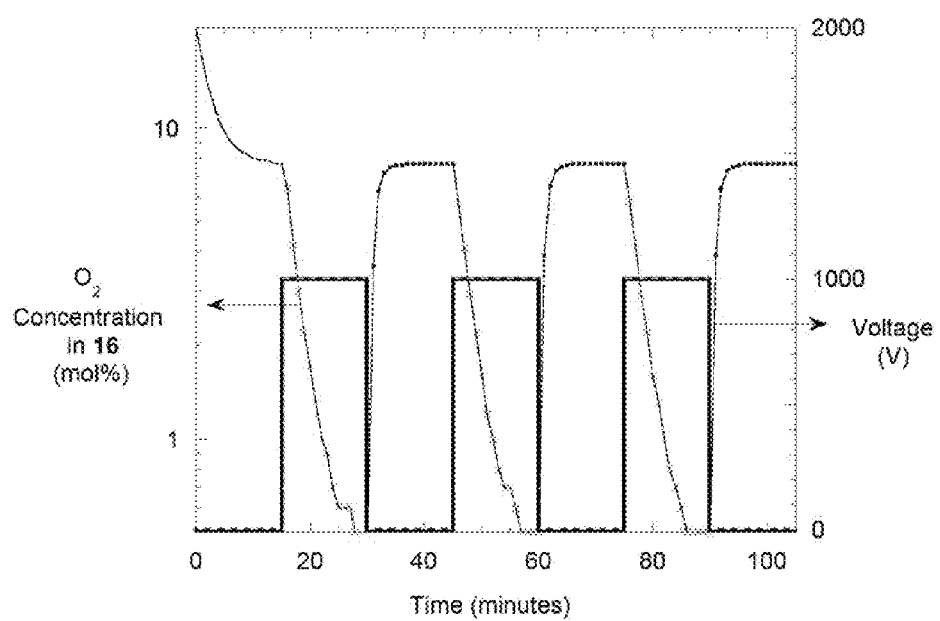
FIG. 16 is a graph of the $O_2$ concentration in the low concentration side of the test cell for an adaptive membrane structure in actuated (voltage on) and unactuated states (Example 2).

The change in $O_2$ concentration in the low concentration side of the cell, as the input voltage changed, is shown in FIG. 16. Also plotted in the figure is the cyclical change in the input voltage to the membrane circuit. The y-axis on the left hand side of the figure represents the changes in $O_2$ concentration in a logarithmic scale while the y-axis on the right had side of the figure represents the input voltage on a linear scale. The x-axis represents the elapsed time in minutes.

This example demonstrates that gas permeability of the adaptive membrane structure can be repeatedly changed by application of the applied voltage. When a potential difference was applied across the membrane structure and the membranes are electrostatically charged, the conductive coated membranes moved toward each other and "closed down" as indicated by the significant reduction in $O_2$ concentration in the low concentration side of the cell. Conversely, when the voltage was turned off and the electrostatic charge was drained from the membrane structure, the membranes "opened up" as indicated by the significant increase in the $O_2$ concentration in the low concentration side of the permeability cell. The steady state $O_2$ concentration in the low concentration side of the cell, when the membrane structure of this example was in the unactuated state, was 7.7 mol %. Conversely, the steady state $O_2$ concentration on the low side of the cell, when the membrane structure is actuated by 1000 V, was only 0.5 mol %. Thus, the figure of merit of the adaptive membrane structure of this example, calculated as described above, is 56. It should be noted that if there were no change in $O_2$ permeability, when the membrane structure is actuated by voltage, the figure of merit would only be 1.

Example 2

A pair of membranes was prepared from the same polyester film with conductive coating that was used for membranes in Example 1. The size of the holes, the hole pattern and the hole spacing in the membrane pair of this example were the same as those in the membrane pair of Example 1. The only difference between the membrane pairs of this example and the membrane pair of Example 1 was that the holes in the membrane pair of this example were created by laser drilling using a Lambda Physik (Göttingen, Germany) excimer laser Model LPX 220I operating at a wavelength of 193 nm.

An adaptive membrane structure was created by sandwiching one polyester spacer ring, 0.004" in thickness as described in the previous example, between the two membranes. Note that the hole pattern in the two membranes was offset from each other, and when the membranes are assembled, the holes in one membrane were thus out of registration with the holes of the other membrane. Also, when the membranes were stacked in the assembly, the non-conductive surfaces were made to face each other. The membrane structure was mounted and tested in the oxygen permeability cell. After the membrane assembly had been tested for oxygen permeability in the unactuated state, a potential difference of 1000 V was applied to actuate the membrane assembly. After 15 minutes, the membrane structure was deactuated by turning off the voltage source and draining the electrostatic charge from the conductive membranes. The steady state $O_2$ concentration fell from 7.3 mol % in the unactuated state to 0.4 mol % when the membrane assembly was actuated by 1000 V. The $O_2$ concentration returned to 7.3 mol % when the voltage was turned off. The figure of merit for this membrane assembly was calculated to be 58.

Example 3

Two rectangular pieces (6"×5") of the same polyester film with conductive coating used in Example 1 were washed for one hour in a 5 wt % aqueous solution of DuPont Oxone® monopersulfate compound, obtained from Aldrich Chemical Company, Inc. (Milwaukee, Wis.). This washing process completely removes the conductive coating from the surface of the films. The excimer laser apparatus, described in Example 2, was then used to drill holes into the uncoated polyester films. The diameter of the holes, the pattern of holes and the spacing between the holes was the same as created in the membrane pairs of Example 1 and Example 2.

Figure 17:
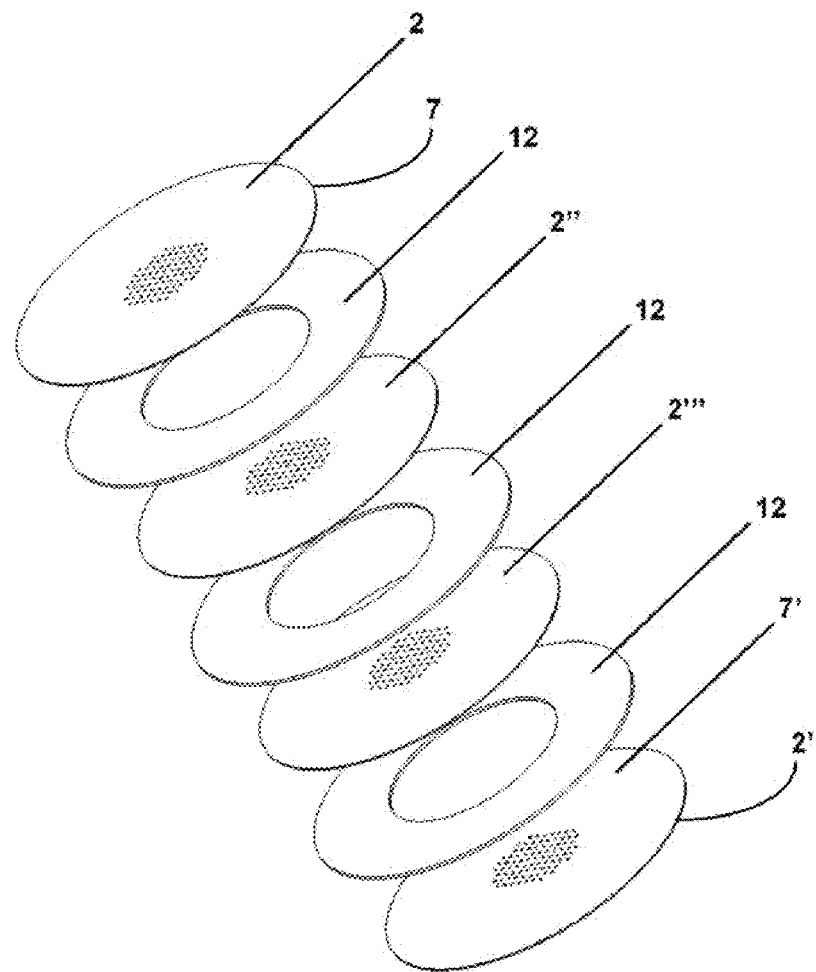
FIG. 17 is a schematic diagram of an exploded view of an adaptive membrane structure containing four membranes and three spacers, as disclosed in Example 4.

The membrane pair with conductive coatings from Example 3, the uncoated membrane pair from this example and three polyester spacer rings (one between each adjacent membrane) were combined to form a membrane assembly comprising the four membranes. FIG. 17 shows the make up of the membrane assembly. When the assembly was created, care was taken to ensure that (i) all the holes in any given membrane were out of registration with all the holes of its nearest neighbor, and (ii) the membranes with conductive coatings formed the outer most layers in the assembly.

The oxygen permeability of this assembly in the unactuated state and the actuated state was tested using the permeability cell described above. A potential difference of 1000 V, applied to the two conductive coatings of the outer membranes, was used to actuate the membrane assembly. The steady state $O_2$ concentration in the low concentration side of the cell, when the membrane was in the unactuated state, was 4.9 mol %, but when the membrane was in the actuated state, the steady state $O_2$ concentration was only 0.2 mol %. This shows that the membranes can be made to "close down" when an external voltage is applied. The FIG. 30 of merit of the four-layer membrane of this example was calculated to be 50. This example also demonstrates that the adaptive membrane structures of this invention can contain more than two membranes, and that, when an electrostatic force is the actuating stimulus, not all of the membranes need have a conductive coating.

Example 4

Two rectangular pieces (6"×5") of the polyester film with conductive coating described in Example 1 were punched on the VIPROS punching machine to form a pair of membranes, each with an array of 0.04" diameter holes. The holes were punched from the non-conductive side of the polyester films. One membrane had a total of 24 holes while the second membrane had 21 holes. The hole pattern in both membranes was a regular square pitch pattern, with center to center distance between any two nearest neighboring holes being 0.222". The hole pattern in each membrane covered 1"×1" square area in the central region of the circular film. As in Example 1, the hole pattern in one membrane was offset from the hole pattern in other membrane by a distance that was half of the center to center distance between neighboring holes. This offset was created in both the x axis and the y axis direction where the x and y axis are orthogonal to each other and are contained in the plane of the membrane. Thus, when the two membranes were precisely laid on top of each other, all the holes in one membrane were out of registration with all the holes in the other membrane.

An adaptive membrane structure was created by sandwiching four 0.004" thick polyester spacer rings between these membranes. The non-conductive surfaces of the membranes were assembled to directly face each other. The performance of the membrane assembly in the actuated state and the unactuated state was tested in the $O_2$ permeability cell as described above. The membrane assembly was actuated by 1000 V. When the membrane assembly was in the unactuated state, the steady state $O_2$ concentration in low concentration side of the cell was 5.5 mol %. In the actuated state, the steady state $O_2$ concentration was below 0.1 wt %, the lowest $O_2$ level detectable by the sensor. Hence, the figure of merit of this membrane assembly is essentially infinity, thereby indicating complete closure.

Example 5

Two rectangular pieces (6"×5") of 1 mil thick polyimide film, sold by DuPont (Wilmington, Del.) under the trade name of Kapton®, were coated with Sylgard® 184, a two part silicone elastomer formulation sold by Dow Corning (Midland, Mich.). The elastomer formulation was prepared by mixing 97 parts of the polydimethylsiloxane (PDMS) polymer with 3 parts crosslinker. The resulting viscous liquid was coated onto the polyimide films using a #2.5 Drawdown Rod sold by Paul N. Gardner Company, Inc. (Pompano Beach, Fla.). The wet elastomer coatings were cured for 1 hour in a flow-through convection oven at 100° C. The cured elastomer layer made the polyimide films tacky on one side and hence allowed them to adhere to other smooth surfaces. A circular hole, 2" in diameter, was punched in the central region of each of the polyimide films. These films were then set aside to serve as stencils for coating polyester films as described below.

Two rectangular pieces (6'×5") of polyester film with conductive coating as described in Example 1, were washed in methanol to remove any residual oil or grease from the film surfaces. The dry films, with the conductive surface facing downwards, were laid on to a clean and smooth glass surface. The two elastomer-coated polyimide stencils, as described above, were laid over with the tacky surface facing the polyester films and then made to adhere to the non-conductive surfaces of the polyester films. Now only the 2" circular region in the center of each of the polyester films was exposed, while the other parts of the polyester films were covered with the polyimide films. The resulting bilayer films were coated with Elastosil® 6238 silicone elastomer formulation sold by Wacker Silicones (Munich, Germany). The formulation was prepared by mixing 97 parts of PDMS with 3 parts of the crosslinker. A #2.5 Drawdown Rod was used for creating a uniform coating. Immediately after the coating step, the polyimide stencils were carefully peeled away from the polyester films, thus leaving behind a 2" circular patch of a wet silicone elastomer coated on the nonconductive surface of each polyester film. The elastomer coating was cured at 100° C. for 1 hr. The average thickness of the cured elastomer layer was 0.0025".

Arrays of holes were added to the pair of elastomer coated polyester films by punching using the same machine used previously. The hole diameter, hole spacing and hole pattern were the same as in the membrane pair of Example 1. Holes were punched from the elastomer-coated surface towards the conductive surface.

An adaptive membrane structure was created by sandwiching two 0.004" thick polyester spacer rings between the elastomer-coated membranes. The membranes were assembled such that the elastomer-coated surfaces were facing each other. The performance of the membrane was tested in the $O_2$ permeability cell as described above. The steady state $O_2$ concentration in the low concentration side of the cell, when the membrane assembly was in the unactuated state, is 7.7 mol %. When the membrane assembly was actuated by 2000 V, the steady state $O_2$ concentration dropped to 0.1 mol %. The figure of merit of this membrane assembly was, therefore, calculated to be 290.

Example 6

A roll of polyvinylidene fluoride (PVDF) film, 0.003 inches in thickness, was obtained from Westlake Plastics Company (Lenni, Pa.). One surface of this PVDF film was very smooth while the other surface was rough. Two rectangular pieces (6"×5") were cut from the PVDF film roll and washed in methanol. The films were then heat treated by placing them in a heated convection oven at 120° C. for 1 hour. The rough sides of the films were then made electrically conductive by depositing an aluminum layer using a chemical vapor deposition process. The thickness of the aluminum layer could not be measured accurately because of the inherent roughness of the PVDF film surface. However, sufficient aluminum was deposited such that the resulting films became optically opaque, and they offered electrical resistance of a few ohms when electrodes of a multimeter were placed 4" apart at the edges of the metallic surface of the aluminum coated PVDF film.

Arrays of holes were added to the pair of PVDF films with conductive coatings by laser drilling using the excimer laser as described in Example 2. Holes are drilled from the smooth surface of the PVDF films. The size of the holes, the spacing of the holes and the hole pattern in the membranes were the same as used for the membrane pair in Example 1. After the drilling step, each PVDF membrane was sandwiched between the optically flat and mirror smooth surfaces of two silicon wafers. The sandwich thus created was placed between the heated plates of a hydraulic press. The temperature of the plates was held at 120° C. When the silicon wafers had reached a steady state temperature, the wafer sandwich was compressed for 2 minutes at an applied stress of 314 $lb/in^2$.

This compression process helped to reduce surface deformities in the membranes that may have been created by the laser drilling process. An adaptive membrane structure was created by sandwiching two 0.004" thick polyester ring spacers between the PVDF membranes. In the membrane assembly, the non-conductive surfaces of the PVDF membranes directly faced each other. The membrane assembly was tested in the $O_2$ permeability cell described previously. The steady state $O_2$ concentration in the low concentration side of the cell, when the membrane assembly was in the unactuated state, was 7.8 mol %. When the membrane assembly was actuated by 1000 V, the steady state $O_2$ concentration dropped to 0.2 mol %. The figure of merit of this membrane assembly was calculated to be 151.

Example 7

This example illustrates a lithographic method for printing discrete electrically conductive features onto a flexible polymer film. The electrical circuit or artwork that was to be printed onto a flexible polymer film was first transferred to a negative photomask. A 0.002" thick polyimide film having a thin conductive copper coating on one side of the film, sold under the trade name of Pyralux® by DuPont (Wilmington Del.), was used as the substrate onto which the conductive circuit was to be printed.

This flexible conductive film was sequentially washed in (i) Versa-Clean® 415 solution (Fisher Scientific International Inc., Hampton, N.H.) at 45° C., (ii) deionized water at room temperature, (iii) Sure Etch 550 acidic copper etchant (Dayton Superior, Kansas City, Kans.) at 35° C., and (iv) deionized water at room temperature. The clean copper surface of the flexible conductive film was then laminated to a Riston® 9415 photoresist film using a Vacrel® SMVL-100 vacuum laminator (both from DuPont). The negative photomask was laid on top of the photoresist film, and the photoresist was then exposed to ultraviolet light in a Riston® PC printer 130. The total energy density for the exposure was 100 $mJoule/cm^2$.

The exposed film/photoresist laminate was then developed in a Chemcut System CS-2000 developer (Chemcut Corporation, State College, Pa.) at a speed of 77 inch/minute. The developing solution consisted of 1 wt % of sodium carbonate in deionized water. The temperature of the developing solution was 85° F. (29° C.). The developed film was then washed in a 5 wt % solution of DuPont Oxone® monopersulfate compound (Aldrich) in water until all the exposed copper from the polyimide surface had been stripped. In the final step, the photoresist layer was stripped by washing the polyimide film in 3 wt % solution of potassium hydroxide in water. All the features that were originally present in the negative photomask were now imprinted as conductive features on the polyimide film.

Example 8

This example demonstrates an adaptive membrane structure in which electrodes are formed from a network of discrete but interconnected electrically conductive lines that have been printed on the film surface using the lithographic process described in Example 7.

Two separate but matching circuit patterns, one for each membrane in the adaptive membrane structure, were drawn to the same length scale as desired in the final electrical circuit on the membranes. The circuit pattern for each membrane consisted of 200 equal size circular rings printed in a regular face centered square pitch pattern and interconnected by straight lines to complete the electrical circuit as schematically depicted in FIG. 8. The inner diameter and outer diameter of the circular rings in the pattern were 0.051" and 0.070", respectively. The center-to-center distance between the nearest neighbors and the next nearest neighbors were 0.079" and 0.111", respectively. The circular rings were connected by 0.1 mm thick lines. The two circuit patterns were printed onto circular discs of Pyralux® film. The circuit pattern on one film was a mirror image of the circuit pattern on the second film. Hence, when the two patterns were precisely laid on top of each other such that the two film surfaces that supported the conductive features were directly facing each other, all 200 rings in one film precisely overlapped with all 200 rings in the other film.

The excimer laser described in Example 2 was then used to create an array of holes in the films with the matching circuit pattern. A total of 100 equal sized holes, 0.04" in diameter, in a 10 hole×10 hole regular square pitch pattern, were drilled in each film. All holes were drilled such that the circular conductive features completely encircled each hole (see FIG. 8). The center to center spacing between any two neighboring holes was 0.111". The hole pattern in one membrane was offset from the hole pattern in the other membrane by a distance that was half of the center to center distance between neighboring holes. This offset was created in both the x axis and the y axis directions where the x and y axis are orthogonal to each other and are contained in the plane of the membrane. Thus, when the two membranes were precisely laid on top of each other, all the holes in one membrane were out of registration with all the holes in the other membrane.

An adaptive membrane structure was created by sandwiching two 0.004" thick polyester spacer rings between the pair of membranes. In the membrane assembly, the non-conductive surfaces of the membranes were made to face each other. The membrane assembly was tested in the $O_2$ permeability cell described above. In the unactuated state, the steady state concentration of $O_2$ in the low concentration side of the cell was 8.9 mol %. When the membrane was actuated by 2000 V, the steady state $O_2$ concentration dropped to 0.5 mol %. The figure of merit for the membrane assembly of this example was calculated to be 114.

Example 9

This example demonstrates a method that can be used for fabricating adaptive membranes of this invention and then incorporating these membranes into planar sheets or panels to create protective enclosures.

FIG. 20 shows an exploded view and an assembled view of a circular adaptive membrane to be used as one module in the assembly of a flat-panel adaptive membrane structure. Referring to FIG. 20, Membranes A (2) and Membrane B (2') were formed on a punching machine from polyvinyl fluoride film with a thickness of 0.001", sold by E. I. du Pont de Nemours and Company under the trade name of Tedlar®. Before forming the membranes, a continuous role of Tedlar® film was metallized with thin aluminum coating on one side, by a plasma process. The surface resistivity of the conductive layer was determined to be 1 ohm/square. Membrane A contained 156 equal size holes punched in a regular square pattern, where the center to center spacing between holes was 0.111". The diameter of the holes was 0.040". Membrane B contained 101 holes, which had the same size, spacing and pattern as the holes in Membrane B except that the entire hole pattern in Membrane B was shifted by a distance of 0.056" in both the x and the y direction. This offset pattern ensured that when the two membranes were assembled on top of each other as shown, the holes in one membrane were completely out of registration from the holes in the other membrane. The OD of the membranes was 2.125". The spacer (12) was formed also on a punching machine from a 0.004" thick Mylar® polyester film. The OD and the ID of the spacer were 2.125" and 1.625", respectively. Both sides of the spacer were coated with pressure sensitive adhesive (part number 9770) manufactured by 3M Company. Copper connector rings (7, 7') were made by punching copper foil coated on one side by an electrically conductive adhesive. The adhesive copper foil with a product number 1182 was also manufactured from 3M Company (St. Paul, Minn., USA). The purpose of the copper rings is to provide electrical connectivity between neighboring modules. A stiffener ring (20) was punched from a 0.007" thick Mylar® polyester sheet and had the same dimensions as the spacer ring. The stiffener ring was also coated on both sides with the 9770 adhesive.

All the parts were assembled as shown in FIG. 20 and were held together by the pressure sensitive adhesive layers. Mechanical jigs were used during assembly to ensure proper alignment between different components. Care was taken to ensure that the metal conductive coatings on Membranes A and B faced to the outside and away from each other and that the conductive adhesive layers on the two copper rings were used to make electrical contact with the membranes. The average porosity of the module was calculated to be 4.6%. The percent covered area was estimated to be around 18.5%.

The fully assembled modules were incorporated into a flat sheet to create a flat panel adaptive membrane structure as follows. A rectangular sheet of butyl rubber having the dimensions, 14"×26"×0.010" was cut out from a roll. Thirty-two circular holes, each with a diameter of 1.625", were punched into the rubber sheet. The holes formed a regularly spaced 4×8 array with center to center spacing of 2.875" between neighboring holes. A fully assembled module was adhered on to the rubber sheet over each hole. When each module was mounted, the stiffener ring was adjacent to the butyl rubber surface. The total porosity of the rectangular panel, with 32 modules was calculated to around 1.5%

When all 32 modules had been mounted, they were electrically connected to each other in parallel using the daisy chain wiring scheme. Electrical connections were made with wires and silver solder. The tabs on the copper ring adjacent to a membrane were soldered to create the electrical connectivity between a membrane and a wire. All A membranes were connected to each other and all B membranes were connected to each other. The last module at the end of the daisy chain was connected via an electrical switch to a small hand held 1000 V DC power supply that was powered by a 12 V DC battery. When the electrical switch was turned on all A membranes were at a potential of 1000 V while all B membranes were at a potential of 0 V. The potential difference across the membranes enabled the membrane pairs to come together and shut off the path for diffusion and convection.

The performance of the 32 module panel was tested by exposing the panel to methyl salicylate (MeSal) simulant using a test protocol very similar to that used in the Man In Simulant Test (MIST) protocol as described in ASTM method F2588-07 "Standard Test Method for Man-In-Simulant Test (MIST) for Protective Ensembles".

Figure 21:
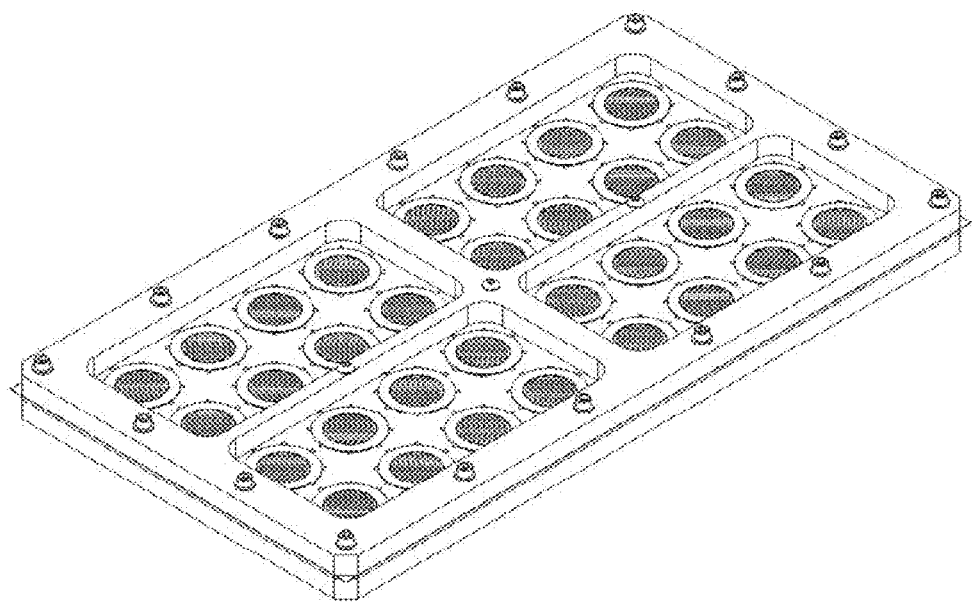
FIG. 21 is a schematic diagram of a flat-panel adaptive membrane structure comprising 32 modules, clamped in between two halves of an apparatus

The rubber panel comprising the adaptive modules was clamped in between two halves of an apparatus as shown in FIG. 21. The front half of the apparatus enables the flat panel and all the adaptive modules to be completely exposed to the environment. The back half of the apparatus had the internal dimensions of 24"×11.75"×0.14" and was completely sealed from the environment. Before the rubber panel was installed in the apparatus, 12 MeSal detection pads were adhered to flat wall of the back half of the apparatus. The 12 pads were distributed though out the back half of the apparatus to sample the environment behind the adaptive panel.

The flat panel, constrained in the apparatus as shown in FIG. 21, was placed in the room used for MIS tests. No voltage was applied to the modules and hence the modules were left in the unactuated state. Additional MeSal detection pads were placed in different regions of the room to sample the environment in the room. The room was sealed and the environment in the room was brought to 25° C. and 50% relative humidity. At that point MeSal vapors were allowed to permeate the entire room by dripping liquid MeSal drop wise from a syringe pump onto a heated plate. Once the MeSal vapor concentration in the room reached 16 ppm, it was held at that concentration for 2 additional hours. Hence the rubber panel with adaptive modules was exposed to MeS vapors for at least two hours, after which the room was thoroughly purged with clean air to remove the MeSal vapors. Once the room was safe for entry, the apparatus was removed from the room, the MeSal detection pads were collected from the back wall of the apparatus and analyzed for the amount of MeSal absorbed by each pad. The pads that had been placed outside the apparatus to sample the environment in the room during the MIS test were also analyzed for MeSal.

A second test was performed. This test was very similar to the first test except that the 32 adaptive modules were actuated by a voltage of 1000 V before the room was sealed. At the end of the MIS test, the voltage was turned off, and the MeSal test pads were collected and analyzed along with the pads that were placed in different regions of the room.

The results from the two tests are summarized in the table below.

|  | MeSal Outside (µg) | MeSal Behind flat panel (µg) |
|---|---|---|
| Unactuated | 116 ± 6 | 15 ± 18 |
| Actuated | 104 ± 13 | 0.2 ± 0.4 |

The results show that there was a more than 100-fold reduction in the amount of MeSal that permeated through the actuated adaptive panel than through the unactuated panel.

The method disclosed in this example for fabricating adaptive modules and incorporating them into planar sheets can be used to fabricate enclosures for various protective applications.

Example 10

This example demonstrates the use of a adaptive membrane structure to create large-area weather-resistant barrier membranes and panels that control water vapor transport across residential and commercial building envelopes.

A 6"×6" membrane panel was created as follows. Two square sheets roughly 6"×6" were cut out from the roll of metalized polyvinyl fluoride film used in Example 9. These sheets were converted to a pair of membranes following the invention by punching rectangular holes through the polymer film and the conductive coating thereof. The length and width of the rectangular holes was 0.375" and 0.031", respectively. All holes were of the same size. The first membrane contained four equal rectangular arrays of holes. Each array was made up of 12 rows and 7 columns and comprised 84 holes. The center to center distance between each row was 0.438" and the center to center distance between each column was 0.125". The distance between the end of one array and the start of the adjacent array was 0.407". Membrane A comprised a total of 336 holes. Membrane B also contained four equal arrays of holes but the arrays were made up of 11 rows and 8 columns. The distance between holes, rows, columns and arrays in Membrane B was same as for Membrane A. Membrane B contained a total of 352 holes. However, the array of holes in Membrane B, were shifted by a distance of 0.075" in the x direction and 0.219" in the y direction with respect to the holes in Membrane A. This offset ensured that the holes in Membrane B were completely out of registration with holes in Membrane A and that there was zero overlap between holes in the two membranes when they were assembled on top of each other.

A 6"×6" sheet of Mylar® polyester film, having thickness of 0.004" was used to create the spacer sheet. In this sheet four equally spaced large equal size rectangular slits were cut out with a sharp cutting tool. The length and width of the slits were 5.25" and 1.00", respectively. The horizontal center to center distance between each slit was 1.188".

An adaptive membrane structure was created by sandwiching the 0.004" thick spacer sheet between Membranes A and B. The sandwich assembly was created such that the metallic layers on both membranes were facing to the outside. Also the holes in one membrane were completely out of registration with the holes in the opposite membrane and no hole in either membrane was covered by the polyester spacer sheet. The average porosity of the assembled adaptive membrane structure was estimated to be 14.5%. The percent covered area was estimated to be 76%.

In order to quantify performance, the assembled structure was mounted in between two halves of a Plexiglas® permeability cell. The inner dimensions of each cell were 5.25"× 5.25"×0.0625". Each half had an inlet and an outlet to allow for gas and vapor flow to each side of the cell.

The performance of the adaptive membrane structure was measured by using the Differential Moisture Permeation Cell (DMPC) method as described by Gibson and coworkers (Phillip Gibson, Cyrus Kendrick, Donald Rivin, Linda Sicuranza and Majid Charmchi, *Journal of Coated Fabrics*, Volume 24, 1995). The permeability cell with the adaptive membrane assembly was installed in the DMPC apparatus. The temperature for the apparatus was set to 37° C. At the start of the experiment, the adaptive membrane was left in the unactuated state and no voltage was applied across the membrane assembly. One side of the adaptive membrane, termed as the wet side, was then exposed to air of a constant relative humidity (RH) while the other side, termed as the dry side was exposed to dry air with almost 0% RH. Care was taken to ensure that the pressure difference across the membrane was less than 0.005 torr. Because of the difference in water vapor concentration across the membrane surfaces, water vapor diffused across the membrane. The flux of water vapor defined as the weight of water vapor transmitted per unit area of the membrane and per unit time was calculated by measuring the amount of water vapor on the dry side of the membrane. The relative humidity of air on the wet side was systematically varied between 20% and 90% and the resulting water vapor flux calculated.

Figure 22:
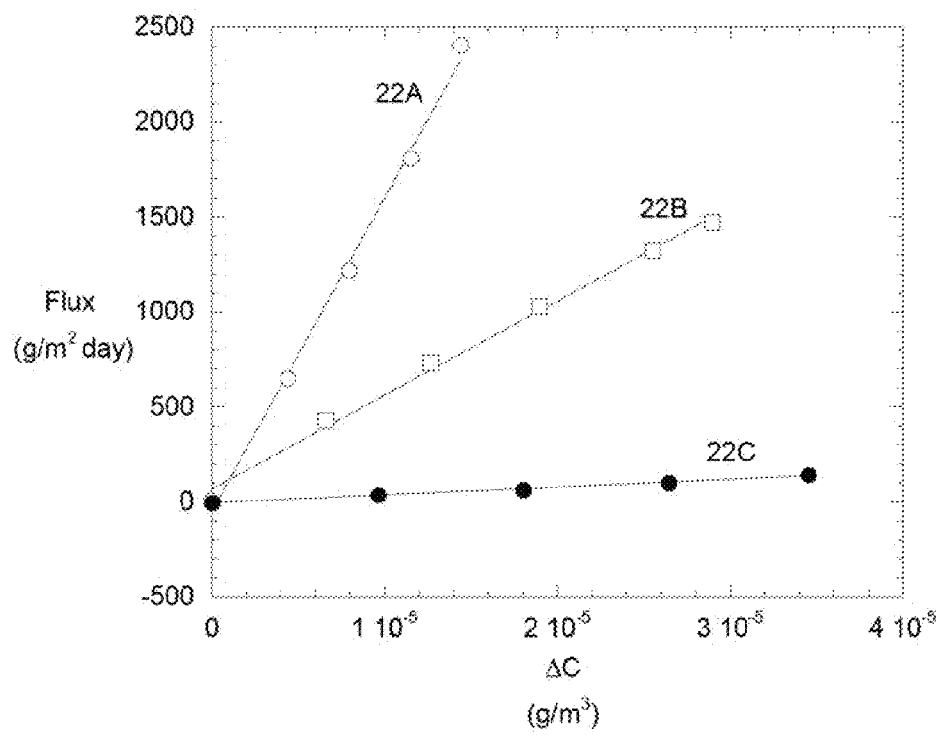
FIG. 22 is a plot of water vapor flux as a function of difference in water vapor concentration for an adaptive membrane structure assembly in the unactuated (line 22A) and actuated (line 22C) states and for Tyvek® Homewrap (line 22B).

Next, the adaptive membrane structure assembly was actuated by applying a DC voltage of 1000 volt across Membranes A and B. The water vapor flux across the actuated membrane structure assembly was determined for varying levels of relative humidity. FIG. 22 shows water vapor flux for the membrane assembly in the unactuated (line 22A) and actuated (line 22C) states as a function of difference in water vapor concentration. From the plot, one can see that the water vapor flux across the membrane was reduced significantly when the adaptive membrane was actuated by voltage.

In order to demonstrate that the change in water vapor flux was highly significant, the water vapor flux of Tyvek® HomeWrap®, a commercial weather resistant barrier membrane sold by E.I. duPont & Nemours Company was also measured by the DMPC method. The water vapor flux data for Tyvek® HomeWrap is also shown in FIG. 22 (line 22B) Those skilled in the art will note that adaptive membrane structure disclosed in this example is 4 times more permeable than Tyvek® Homewrap and yet is transformed to 10 times less permeable than Homewrap® by the application of DC voltage.

Those skilled in the art will also note that the adaptive membrane structure disclosed in this example may be easily expanded to create large area membranes that can be used to cover parts or entire walls of residential buildings and there by be used to control ingress and egress of water vapor from building envelopes.

We claim:

1. An article comprising at least one adaptive membrane structure, said adaptive membrane structure comprising first and second membranes, and means to respond to an actuating stimulus, so that said response moves the first membrane into contact with the second membrane, thereby decreasing the permeability of the structure to gas, vapor, liquid and/or particulates, whereby such response provides environmental protection to a human, animal, or object enclosed by or wearing the article, wherein
  (a) each membrane has an array of holes, and the holes of the first membrane are substantially out of registration, or are out of registration, with the holes of the second membrane;
  (b) the porosity of the article is at least 0.5%;
  (c) the actuating stimulus is
    (i) an electrostatic force, and the means to respond is an electrically conductive material that is incorporated in, on, or adjacent to the adaptive membrane structure or
    (ii) a magnetic force, and the means to respond is a magnetic material that is incorporated in, on, or adjacent to the adaptive membrane structure, in close enough physical proximity to enable application of the force of the actuating stimulus to move at least one membrane;
  (d) the article has an exposed area of at least about one square foot and the at least one adaptive membrane structure provides at least 10% coverage of the exposed area; and
  (e) the article is an enclosure for the occupancy of humans, animals, or objects; or an item of apparel.

2. The article of claim 1 wherein the adaptive membrane structure further comprises a third membrane having holes, and means to respond to an actuating stimulus that moves the third membrane into contact with the second membrane in a position in which the holes of the third membrane are substantially out of registration, or out of registration, with the holes of the second membrane.

3. The article of claim 1 wherein one or both membranes have an electrically conductive coating on a surface thereof and the actuating stimulus is an electrostatic force and the means to respond is the electrically conductive coating.

4. The article of claim 3 wherein the conductive coating is applied in a pattern that covers selected areas of a membrane's surface.

5. The article of claim 3 wherein the conductive coating is itself coated with one or more layers of dielectric material.

6. The article of claim 1 wherein the adaptive membrane structure further comprises one or more spacers between the membranes wherein no spacer blocks a hole.

7. The article of claim 1 wherein the actuating stimulus is applied manually.

8. The article of claim 1 wherein the actuating stimulus operates to a substantially uniform extent on all portions of the first membrane.

9. The article of claim 1, which is impermeable to a selected human pathogen or toxin in its actuated state.

10. The article of claim 1 wherein the adaptive membrane structure further comprises one or more membranes in addition to the first and second membranes, and/or one or more layers of fabric.

11. The article of claim 1 wherein at least one membrane comprises at least one polymer.

12. The article of claim 1 wherein at least one membrane comprises at least one member of the group consisting of activated carbon, high surface silica, molecular sieves, xerogels, ion exchange materials, powdered metal oxides, powdered metal hydroxides, and antimicrobial agents.

13. The article of claim 1 which is an item of apparel, wherein the item of apparel is selected from the group consisting of protective suits, protective coverings, hats, hoods, masks, gowns, coats, jackets, shirts, trousers, pants, gloves, boots, shoes and socks.

14. The item of apparel of claim 13 which comprises one or more layers of fabric adjacent to one or both of the first and second membranes.

15. The article of claim 1 which is an enclosure for the occupancy of humans, animals, or objects, wherein the enclosure is selected from the group consisting of tents, safe rooms, clean rooms, greenhouses, dwellings, office buildings and storage containers.

* * * * *